(12) United States Patent
Kanehara et al.

(10) Patent No.: US 10,994,796 B2
(45) Date of Patent: May 4, 2021

(54) LEANING VEHICLE

(71) Applicant: YAMAHA HATSUDOKI KABUSHIKI KAISHA, Iwata (JP)

(72) Inventors: Shuhei Kanehara, Iwata (JP); Tsunero Hamada, Iwata (JP); Yukihide Fukuhara, Iwata (JP); Takeshi Toyota, Iwata (JP); Nobuo Hara, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 126 days.

(21) Appl. No.: 15/976,635

(22) Filed: May 10, 2018

(65) Prior Publication Data

US 2018/0257728 A1 Sep. 13, 2018

Related U.S. Application Data

(63) Continuation of application No. PCT/JP2016/083615, filed on Nov. 11, 2016.

(30) Foreign Application Priority Data

Nov. 13, 2015 (JP) .............................. JP2015-223251

(51) Int. Cl.
*B62K 5/08* (2006.01)
*B62K 5/05* (2013.01)
(Continued)

(52) U.S. Cl.
CPC .............. *B62K 5/08* (2013.01); *B60G 21/007* (2013.01); *B62D 9/02* (2013.01); *B62K 5/01* (2013.01);
(Continued)

(58) Field of Classification Search
CPC .......... B62K 5/00; B62K 5/003; B62K 5/007; B62K 5/01; B62K 5/027; B62K 5/05;
(Continued)

(56) References Cited

U.S. PATENT DOCUMENTS 6,234,263 B1 * 5/2001 Boivin ................... B62K 21/00
180/184
7,096,988 B2 * 8/2006 Moriyama ............. B62K 21/00
180/183

(Continued)

FOREIGN PATENT DOCUMENTS

JP H01-208290 A 8/1989
JP 2003-535742 A 12/2003
(Continued)

*Primary Examiner* — Kevin Hurley
*Assistant Examiner* — Maurice L Williams
(74) *Attorney, Agent, or Firm* — Rabin & Berdo, P.C.

(57) ABSTRACT

A leaning vehicle includes an actuator, a left steerable front wheel, a right steerable front wheel, a steering mechanism and a leaning mechanism. The steering mechanism includes a first center steering shaft, a second center steering shaft disposed at the front side of the first center steering shaft, and a center steering shaft rotation interlocking mechanism that interlocks rotation of the first center steering shaft with rotation of the second center steering shaft. The actuator is provided between a left end and a right end of a link member of the leaning mechanism in the left-right direction. At least one part of the actuator is provided at a position that overlaps with a movable range of the center steering shaft rotation interlocking mechanism as viewed from the up direction or the down direction.

11 Claims, 18 Drawing Sheets

(51) Int. Cl.
  *B62K 5/10* (2013.01)
  *B62K 21/18* (2006.01)
  *B62K 5/027* (2013.01)
  *B62D 9/02* (2006.01)
  *B60G 21/00* (2006.01)
  *B62K 19/32* (2006.01)
  *B62K 5/00* (2013.01)
  *B62K 5/01* (2013.01)

(52) U.S. Cl.
  CPC ............... *B62K 5/027* (2013.01); *B62K 5/05* (2013.01); *B62K 5/10* (2013.01); *B62K 19/32* (2013.01); *B62K 21/18* (2013.01); *B60G 2204/422* (2013.01); *B60G 2204/4222* (2013.01); *B60G 2300/45* (2013.01); *B62K 2005/001* (2013.01)

(58) Field of Classification Search
  CPC ...... B62K 5/08; B62K 5/10; B62K 2005/001; B62K 19/32; B62K 21/18; B60G 21/005; B60G 21/007; B60G 21/026; B60G 2204/422; B60G 2204/4222; B60G 2300/122; B60G 2300/124; B60G 2300/322; B60G 2300/45; B62D 9/02; B62D 9/04
  See application file for complete search history.

(56) References Cited

U.S. PATENT DOCUMENTS

| | | | |
|---|---|---|---|
| 7,530,419 B2* | 5/2009 | Brudeli | B60G 21/007 180/210 |
| 7,648,148 B1 | 1/2010 | Mercier | |
| 7,717,225 B2* | 5/2010 | Saito | B62D 5/0409 180/443 |
| 8,235,164 B2* | 8/2012 | Okada | B62D 55/07 180/443 |
| 8,583,325 B2 | 11/2013 | Carabelli et al. | |
| 9,327,789 B1* | 5/2016 | Vezina | B62K 5/10 |
| 2002/0046896 A1* | 4/2002 | Takayanagi | B62D 1/16 180/411 |
| 2005/0077100 A1 | 4/2005 | Hasegawa | |
| 2010/0007109 A1* | 1/2010 | Mighell | B62K 5/027 280/124.103 |
| 2011/0215544 A1* | 9/2011 | Rhodig | B60G 21/00 280/124.103 |
| 2012/0160593 A1* | 6/2012 | Nozaki | B62K 5/01 180/400 |
| 2015/0197304 A1* | 7/2015 | Kroening, Jr. | B62K 13/04 180/209 |
| 2015/0291241 A1* | 10/2015 | Takano | B62K 5/05 280/5.509 |
| 2015/0307149 A1* | 10/2015 | Iizuka | B62K 19/38 280/267 |
| 2015/0344091 A1* | 12/2015 | Takano | B62K 25/08 280/269 |

FOREIGN PATENT DOCUMENTS

| | | |
|---|---|---|
| JP | 2005-104285 A | 4/2005 |
| JP | 2009-536893 A | 10/2009 |
| JP | 2009-286266 A | 12/2009 |
| JP | 2013-22993 A | 2/2013 |
| JP | 2014-193677 A | 10/2014 |

* cited by examiner

LEANING VEHICLE

CROSS-REFERENCE TO RELATED APPLICATION

This application is a continuation of International Application PCT/JP2016/083615 filed on Nov. 11, 2016, which claims priority from Japanese Patent Application No. 2015-223251 filed on Nov. 13, 2015. The contents of each of the identified applications are entirely incorporated herein by reference.

TECHNICAL FIELD

The present invention relates to a leaning vehicle which includes: a vehicle body capable of leaning leftward and rightward of the vehicle, and two steerable front wheels arranged side by side in the left-right direction of the vehicle.

BACKGROUND ART

A vehicle equipped with a vehicle body capable of leaning leftward and the rightward of the vehicle, that is, a leaning vehicle, is known. In a leaning vehicle, a left front wheel and a right front wheel are steerable wheels that can be steered. A leaning vehicle includes a leaning mechanism that causes the vehicle body and the left steerable front wheel and right steerable front wheel to lean leftward and rightward of the vehicle. By this means, when the vehicle turns left, the vehicle body, the left steerable front wheel and the right steerable front wheel lean leftward of the vehicle. Further, when the vehicle turns right, the vehicle body, the left steerable front wheel and the right steerable front wheel lean rightward of the vehicle. A leaning vehicle includes a steering mechanism that steers the left steerable front wheel and the right steerable front wheel. In addition, a leaning vehicle is known that is equipped with an actuator that applies a steering force to the left steerable front wheel and the right steerable front wheel (Patent Literature 1, identified further on; in particular, see FIG. 11). According to the aforementioned kind of leaning vehicle, it is possible to assist steering that is performed by an occupant.

CITATION LIST

Patent Literature

Patent Literature 1: U.S. Pat. No. 7,648,148B

In a leaning vehicle that includes a left steerable front wheel and a right steerable front wheel, a steering mechanism that steers the left steerable front wheel and right steerable front wheel, and a leaning mechanism that causes the vehicle body and the left steerable front wheel and the right steerable front wheel to lean are provided in the vicinity of the left steerable front wheel and the right steerable front wheel.

Therefore, when arranging the layout for an actuator that applies a steering force to the left steerable front wheel and the right steerable front wheel, it is necessary to avoid interference between the steering mechanism and the actuator, and interference between the leaning mechanism and the actuator. In this case, the size of the vicinity of the left steerable front wheel and of the right steerable front wheel is liable to increase.

SUMMARY

An object of the present invention is to provide a leaning vehicle in which interference between an actuator that applies a steering force to a left steerable front wheel and a right steerable front wheel, and a steering mechanism and, interference between the actuator and a leaning mechanism are avoided, and an increase in the size of the vicinity of the left steerable front wheel and of the right steerable front wheel is suppressed.

In order to suppress an increase in the size of the vicinity of a left steerable front wheel and a right steerable front wheel, the inventors of the present invention conducted studies regarding the layout of an actuator that applies a steering force to the left steerable front wheel and the right steerable front wheel. First, the inventors conducted detailed studies regarding the motions of a steering mechanism and a leaning mechanism.

With respect to the left-right direction of the leaning vehicle, even when the vehicle body, the left steerable front wheel and the right steerable front wheel lean by a large amount leftward or rightward direction, a tie rod of the steering mechanism and a link member of the leaning mechanism do not lean significantly leftward or rightward. On the other hand, a steering shaft and an actuator lean together with the vehicle body. Therefore, it was found that disposing the actuator at a position that is away from the left steerable front wheel and the right steerable front wheel is effective. However, because of the need to avoid interference with the tie rod of the steering mechanism and the link member of the leaning mechanism, the degree of freedom with respect to the layout of the steering shaft is low. In addition, the space for disposing the actuator over the steering shaft is limited.

Therefore, first, the inventors of the present invention tried a technical idea that is opposite to the conventional technical idea of disposing the actuator at the ideal position. As a result, the inventors found that if the degree of freedom with respect to the layout of the steering shaft is improved, the degree of freedom with respect to the layout of the actuator can also be improved.

Further, although doing so results in an increase in the size of the vicinity of the left steerable front wheel and the right steerable front wheel, the inventors of the present invention made the conscious choice of attempting to adopt a method that constructs the steering shaft using two shafts. When the steering shaft is composed of two shafts, an interlocking mechanism for interlocking the respective rotations of the two shafts is required. Therefore, when the object is to suppress an increase in the size of the vicinity of the left steerable front wheel and the right steerable front wheel, a steering shaft which is composed of two shafts is technology that is considered undesirable to adopt.

However, as a result of studies conducted regarding the above problem, the inventors of the present invention discovered that by devising a suitable positional relation between an actuator and a steering shaft that is composed of two shafts, an increase in the size of the vicinity of the left steerable front wheel and the right steerable front wheel can be suppressed. Thus, the inventors of the present invention discovered that although a steering shaft composed of two shafts is technology that at first glance seems undesirable to adopt to solve the problem of suppressing an increase in the size of the vicinity of the left steerable front wheel and the right steerable front wheel, that problem is overcome by devising a suitable positional relation between the actuator and the steering shaft.

A leaning vehicle according to the present invention that was completed based on the above findings includes: a vehicle body capable of leaning leftward and rightward of the leaning vehicle; a rear wheel supported by the vehicle body; a left steerable front wheel and a right steerable front wheel that are steerable, and that are disposed at the front side of the rear wheel in the front-rear direction of the vehicle body and are disposed side by side in the left-right direction of the vehicle body; a steering mechanism that includes a handle, and that is capable of steering the left steerable front wheel and the right steerable front wheel by means of an operation of the handle; an actuator that applies a steering force to the left steerable front wheel and the right steerable front wheel; and a leaning mechanism that includes a link member which is supported by the vehicle body in a rotatable manner about an axis extending in the front-rear direction of the vehicle body and which supports the left steerable front wheel and the right steerable front wheel, and that causes the vehicle body, the left steerable front wheel and the right steerable front wheel to lean leftward of the leaning vehicle when the vehicle turns left, and that causes the vehicle body, the left steerable front wheel and the right steerable front wheel to lean rightward of the leaning vehicle when the vehicle turns right.

The steering mechanism includes: a first center steering shaft that includes the handle, and that is supported by the vehicle body in a rotatable manner with respect to the vehicle body and is provided at a center of the leaning vehicle in the left-right direction of the leaning vehicle; a second center steering shaft that is supported by the vehicle body in a rotatable manner with respect to the vehicle body, and is provided at the front side of the first center steering shaft in the front-rear direction of the vehicle body and is provided at the center of the leaning vehicle in the left-right direction of the leaning vehicle; a center steering shaft rotation interlocking mechanism that interlocks rotation of the first center steering shaft with rotation of the second center steering shaft; and a left-right rotation interlocking mechanism that steers the left steerable front wheel and the right steerable front wheel by means of rotation of the second center steering shaft.

The center steering shaft rotation interlocking mechanism includes: a first mounting member which is non-rotatably mounted at a lower portion of the first center steering shaft, a second mounting member which is non-rotatably mounted at an upper portion of the second center steering shaft, and a connection member which connects the first mounting member and the second mounting member.

The left-right rotation interlocking mechanism includes an arm member which is provided at a lower portion of the second center steering shaft and which rotates together with the second center steering shaft, and a tie rod which is mounted on the arm member and which is displaceable leftward and rightward of the vehicle body.

At least one of the first center steering shaft and the second center steering shaft is supported by the vehicle body in a rotatable manner about an axis that leans forward or rearward of the vehicle body with respect to the up-down direction of the vehicle body.

The actuator includes: a shaft mounting portion that is non-rotatably mounted on the first center steering shaft or the second center steering shaft; a vehicle body mounting portion that is non-rotatably mounted on the vehicle body; a driving portion that is provided between the shaft mounting portion and the vehicle body mounting portion, and that applies a force to the shaft mounting portion with respect to the vehicle body; and a case portion that covers at least one of at least a part of the shaft mounting portion, at least a part of the vehicle body mounting portion, and at least a part of the driving portion.

When the leaning vehicle is upright on a horizontal plane and stopped in a non-steering state, as viewed from the up direction of the vehicle body, the shaft mounting portion, the vehicle body mounting portion, the driving portion and the case portion are provided between a left end and a right end of the link member of the leaning mechanism in the left-right direction of the vehicle body.

As viewed from the up direction or the down direction of the vehicle body, at least one of at least a part of the shaft mounting portion, at least a part of the vehicle body mounting portion, at least a part of the driving portion, and at least a part of the case portion is provided at a position that overlaps with a movable range of the center steering shaft rotation interlocking mechanism.

The shaft mounting portion of the aforementioned actuator may be non-rotatably mounted on the first center steering shaft or the second center steering shaft that is supported by the vehicle body in a rotatable manner about an axis that leans forward or rearward of the vehicle body with respect to the up-down direction of the vehicle body.

The shaft mounting portion of the aforementioned actuator may be non-rotatably mounted at an upper portion of the first center steering shaft or the second center steering shaft.

When the leaning vehicle is upright on a horizontal plane and stopped in a non-steering state, at least one of at least a part of the aforementioned center steering shaft rotation interlocking mechanism, at least a part of the shaft mounting portion of the actuator, at least a part of the vehicle body mounting portion of the actuator, at least a part of the driving portion of the actuator, and at least a part of the case portion of the actuator may be disposed at the upper side of an upper end of the left steerable front wheel and an upper end of the right steerable front wheel in the up-down direction of the vehicle body.

When the leaning vehicle is upright on a horizontal plane and stopped in a non-steering state, at least one of at least a part of the aforementioned center steering shaft rotation interlocking mechanism, at least a part of the shaft mounting portion of the actuator, at least a part of the vehicle body mounting portion of the actuator, at least a part of the driving portion of the actuator, and at least a part of the case portion of the actuator may be disposed at the rear side of an upper end of the left steerable front wheel and an upper end of the right steerable front wheel in the front-rear direction of the vehicle body.

When the leaning vehicle is upright on a horizontal plane and stopped in a non-steering state, at least one of at least a part of the shaft mounting portion of the actuator, at least a part of the vehicle body mounting portion of the actuator, at least a part of the driving portion of the actuator, and at least a part of the case portion of the actuator may be disposed at a position that overlaps with the link member of the leaning mechanism as viewed from the up direction or the down direction of the vehicle body.

When the leaning vehicle is upright on a horizontal plane and stopped in a non-steering state, at least a part of the aforementioned center steering shaft rotation interlocking mechanism may be disposed at a position that overlaps with the link member of the leaning mechanism as viewed from the up direction or the down direction of the vehicle body.

The term "vehicle body" as used in the present invention refers to a member which mainly receives stress in the vehicle. The vehicle body may be a frame formed by combining a plurality of parts or a frame formed by integral molding. A material for forming the vehicle body may be a metal such as aluminum or iron, a resin such as CFRP, or a combination of these materials. Further, the vehicle body may have a monocoque structure where the vehicle body is formed of an appearance component of a vehicle, or a semi-monocoque structure where a portion of the vehicle body also functions as an appearance component of the vehicle.

The leaning vehicle includes two front wheels and one rear wheel. However, the leaning vehicle of the present invention may include a plurality of rear wheels. For example, the leaning vehicle may include a left rear wheel and a right rear wheel that are arranged side by side in the left-right direction of the vehicle body. In short, the leaning vehicle of the present invention includes at least one rear wheel.

The link member of the leaning vehicle of the present invention is not limited to the link member of the embodiment that is described above. The link member of the present invention may be used in a parallelogram type leaning mechanism. In this case, in the link member, the left steerable front wheel is supported by a left portion of the link member, the right steerable front wheel is supported by a right portion of the link member, and an intermediate portion of the link member is rotatably supported by the vehicle body.

The link member of the leaning vehicle of the present invention may also be used in a double-wishbone type leaning mechanism. In this case, the link member includes a left link member and a right link member. A left portion of the left link member supports the left steerable front wheel, and a right portion of the left link member is supported by the vehicle body. A right portion of the right link member supports the right steerable front wheel, and a left portion of the right link member is supported by the vehicle body.

The link member of the leaning vehicle of the present invention may also be used in a trailing arm type leaning mechanism. In this case, the link member includes a left link member and a right link member. A left front portion of the left link member supports the left steerable front wheel, and a left rear portion of the left link member is supported by the vehicle body. A right front portion of the right link member supports the right steerable front wheel, and a right rear portion of the right link member is supported by the vehicle body.

The leaning mechanism of the present invention may be a double-wishbone type leaning mechanism. The leaning mechanism of the present invention may be a parallelogram type leaning mechanism. The leaning mechanism of the present invention may also be a trailing arm type leaning mechanism. The present invention is applicable to a leaning mechanism having a function of causing a vehicle body, a left steerable front wheel and a right steerable front wheel to lean leftward of a leaning vehicle when the leaning vehicle turns left, and a function of causing the vehicle body, the left steerable front wheel and the right steerable front wheel to lean rightward of the leaning vehicle when the leaning vehicle turns right.

It is sufficient that at least one of the first center steering shaft and the second center steering shaft of the present invention is rotatably supported by the vehicle body about an axis that leans forward or rearward of the vehicle body with respect to the up-down direction of the vehicle body. The first center steering shaft may be rotatably supported by the vehicle body about an axis that leans forward or rearward of the vehicle body with respect to the up-down direction of the vehicle body. The second center steering shaft may be rotatably supported by the vehicle body about an axis that leans forward or rearward of the vehicle body with respect to the up-down direction of the vehicle body. The first center steering shaft and the second center steering shaft may be rotatably supported by the vehicle body about an axis that leans forward or rearward of the vehicle body with respect to the up-down direction of the vehicle body.

The actuator of the present invention assists steering performed by an occupant, by applying a steering force. However, the actuator of the present invention is not limited thereto. For example, when the vehicle is a self-driving vehicle, the actuator of the present invention may apply a steering force that is controlled in response to inputs of various kinds of sensors. The actuator of the present invention is not limited to the purpose of applying a steering force. It is sufficient that the actuator of the present invention is a device that applies a steering force to the left steerable front wheel and the right steerable front wheel.

In the present invention, the vehicle body mounting portion that is non-rotatably mounted on the vehicle body is a region that contacts the vehicle body in a state in which the vehicle body mounting portion is non-rotatable with respect to the vehicle body. The vehicle body mounting portion that is non-rotatably mounted on the vehicle body may be fixed to the vehicle body by a fastening member such as a bolt. Further, the vehicle body mounting portion that is non-rotatably mounted on the vehicle body may be a region that simply contacts the vehicle body without relying on a fastening member such as a bolt. In this case, it is sufficient that the driving portion of the actuator is supported by the steering shaft.

The driving portion of the actuator of the present invention may include an electric motor. The driving portion may include a speed reduction mechanism. The driving portion need not include a speed reduction mechanism.

In the present invention, the case portion of the actuator covers at least one of at least a part of the shaft mounting portion, at least a part of the vehicle body mounting portion, and at least a part of the driving portion. The case portion may cover all of the shaft mounting portion, the vehicle body mounting portion and the driving portion. The case portion may cover a plurality of portions among the shaft mounting portion, the vehicle body mounting portion and the driving portion.

The term "lower portion" of a steering shaft of the present invention refers to a region that, when the steering shaft is divided in two along the rotational axis direction of the steering shaft, is on the lower side of the center of the vehicle body in the up-down direction of the vehicle body. The term "upper portion" of a steering shaft of the present invention refers to a region that, when the steering shaft is divided in two along the rotational axis direction of the steering shaft, is on the upper side of the center of the vehicle body in the up-down direction of the vehicle body.

The term "lower portion of the first center steering shaft" of the present invention refers to a region that, when the first center steering shaft is divided in two along the rotational axis direction of the first center steering shaft, is on the lower side of the center of the vehicle body in the up-down direction of the vehicle body. The term "upper portion of the first center steering shaft" of the present invention refers to a region that, when the first center steering shaft is divided in two along the rotational axis direction of the first center steering shaft, is on the upper side of the center of the vehicle body in the up-down direction of the vehicle body.

The term "lower portion of the second center steering shaft" of the present invention refers to a region that, when the second center steering shaft is divided in two along the rotational axis direction of the second center steering shaft, is on the lower side of the center of the vehicle body in the up-down direction of the vehicle body. The term "upper portion of the second center steering shaft" of the present invention refers to a region that, when the second center steering shaft is divided in two along the rotational axis direction of the second center steering shaft, is on the upper side of the center of the vehicle body in the up-down direction of the vehicle body.

The shaft mounting portion of the actuator of the present invention may be non-rotatably mounted on the first center steering shaft or the second center steering shaft that is supported by the vehicle body in a rotatable manner about an axis that does not lean forward and rearward of the vehicle body with respect to the up-down direction of the vehicle body. Preferably, the shaft mounting portion is non-rotatably mounted on the first center steering shaft or the second center steering shaft that is supported by the vehicle body in a rotatable manner about an axis that leans forward or rearward of the vehicle body with respect to the up-down direction of the vehicle body.

Advantageous Effects of Invention

According to the leaning vehicle of the present invention, interference between an actuator that applies a steering force to a left steerable front wheel and right steerable front wheel, and a steering mechanism and a leaning mechanism is avoided, and an increase in the size of the vicinity of the left steerable front wheel and the right steerable front wheel can be suppressed.

DETAILED DESCRIPTION

Hereunder, one embodiment of the present invention is described while referring to the accompanying drawings.

The embodiment will be described by first referring to FIG. 1 and FIG. 2. A leaning vehicle 1 according to this embodiment is a straddle type three-wheeled vehicle (hereinafter, also simply referred to as "vehicle") including two steerable front wheels 11L, 11R and one rear wheel 12.

Figure 3:
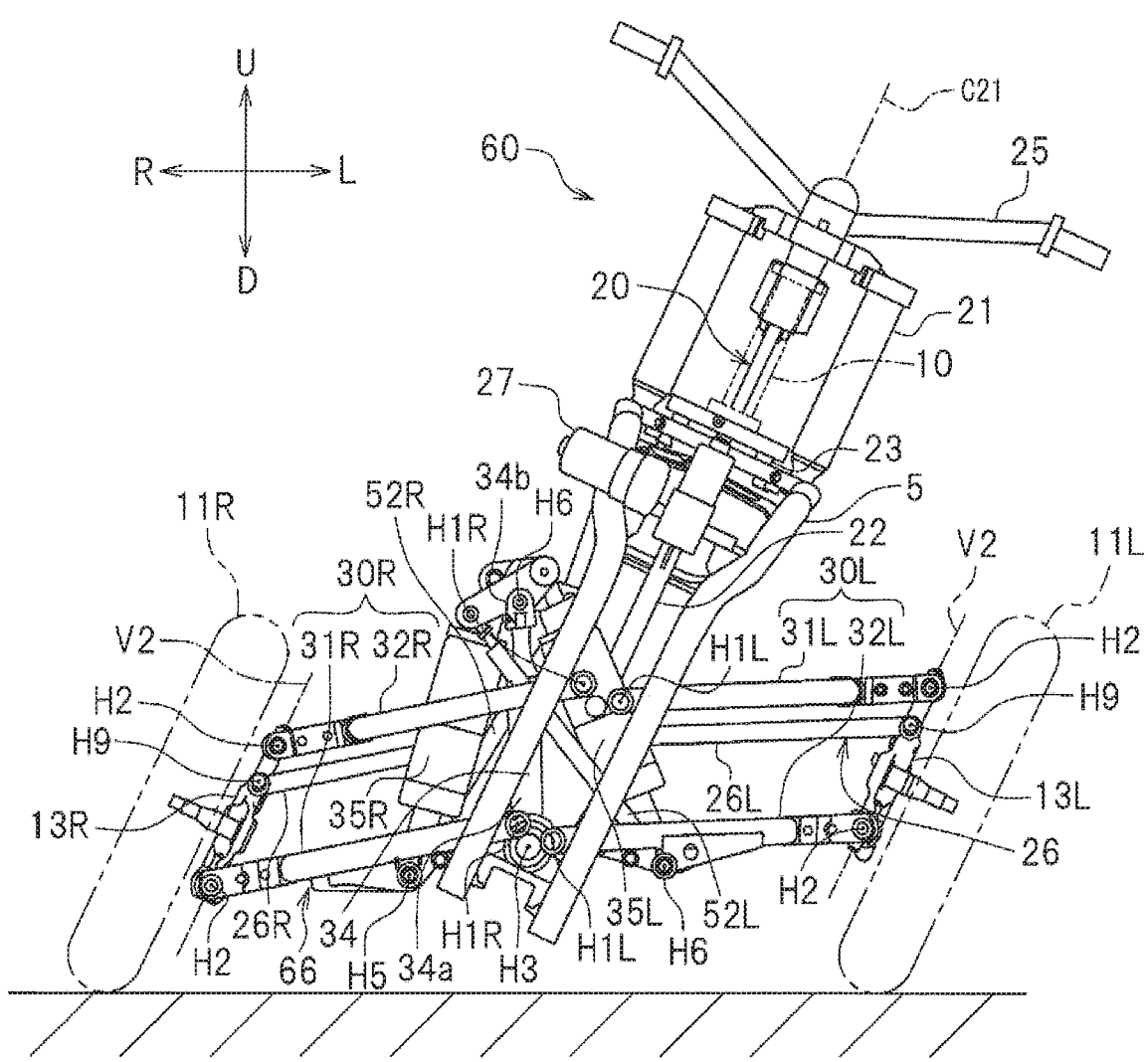
FIG. 3 is the front view of a portion of the leaning vehicle when the vehicle body is in a leaning state.

In this specification, "leaning vehicle" means a vehicle where, referring to FIG. 3, a vehicle body 5 is capable of leaning with respect to a ground surface, and a relative position between the left steerable front wheel 11L and the right steerable front wheel 11R in the up-down direction of the vehicle body 5 changes accompanying leaning of the vehicle body 5. More specifically, "leaning vehicle" means a vehicle in which the vehicle body, the left steerable front wheel and the right steerable front wheel are caused to lean leftward of the vehicle when the vehicle turns left, and the vehicle body, the left steerable front wheel and the right steerable front wheel are caused to lean rightward of the vehicle when the vehicle turns right.

In this specification, unless otherwise specified, "front", "rear", "left", "right", "up" and "down" respectively mean "front", "rear", "left", "right", "up" and "down" as viewed by an occupant seated on a seat 3 when the leaning vehicle 1 is stationary on a horizontal plane in a non-steering state. Reference characters "F", "Re", "L", "R", "U", and "D" in the drawings respectively denote "front", "rear", "left", "right", "up", and "down". The description "the front-rear direction of the vehicle body", the description "the up-down direction of the vehicle body", and the description "the left-right direction of the vehicle body" mean the front-rear direction, the up-down direction, and the left-right direction with reference to the vehicle body. In a state where the leaning vehicle 1 is not steered and the vehicle body 5 is upright, the front-rear direction, the up-down direction, and the left-right direction of the vehicle body 5 respectively match with the front-rear direction, the up-down direction, and the left-right direction of the leaning vehicle 1. However, when the leaning vehicle 1 is in a steering state or the vehicle body 5 is in a leaning state, the front-rear direction, the up-down direction, and the left-right direction of the vehicle body 5 may not match with the front-rear direction, the up-down direction, and the left-right direction of the leaning vehicle 1, respectively. The description "an axis extending in the front-rear direction" is not limited to an axis which is parallel to the front-rear direction, and also includes an axis leaning with respect to the front-rear direction within a range of −45° to +45°. In the same manner, the description "an axis extending in the up-down direction" includes an axis leaning with respect to the up-down direction within a range of −45° to +45°, and the description "an axis extending in the left-right direction" includes an axis leaning with respect to the left-right direction within a range of −45° to +45°.

Figure 1:
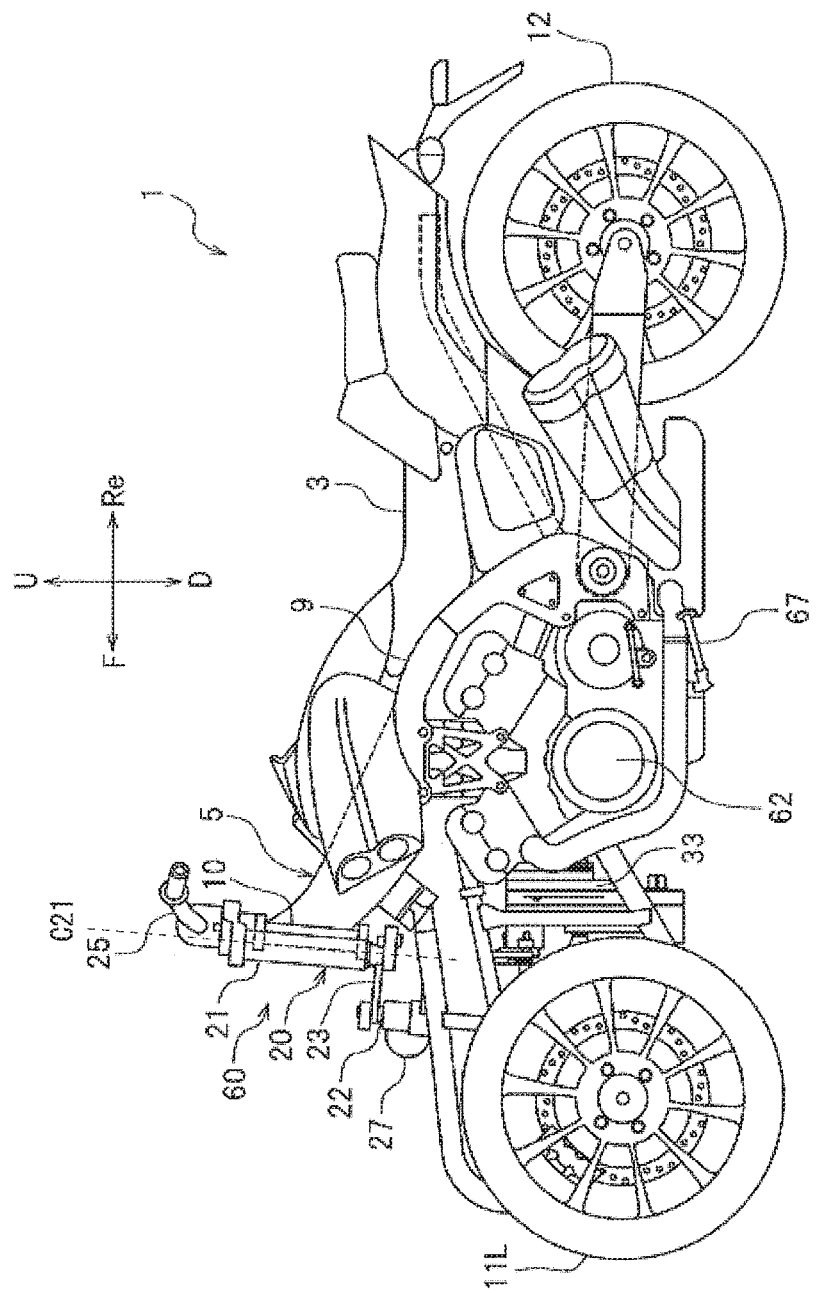
FIG. 1 is the left side view of a leaning vehicle according to one embodiment of the present invention.
Figure 2:
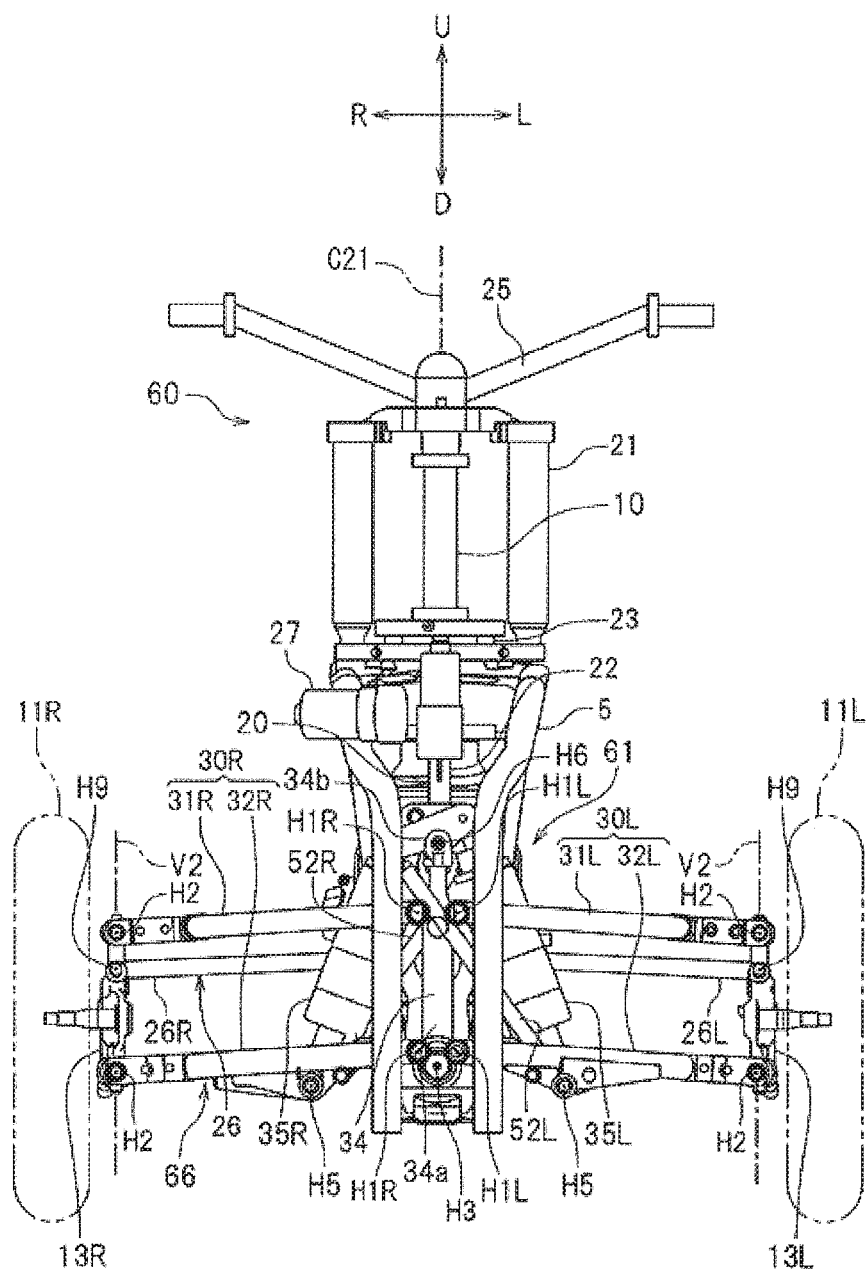
FIG. 2 is the front view of a portion of the leaning vehicle when a vehicle body is in an upright state.

Referring to FIG. 1 and FIG. 2, the leaning vehicle 1 includes the vehicle body 5, the left steerable front wheel 11L, the right steerable front wheel 11R and the rear wheel 12. The leaning vehicle 1 also includes a steering mechanism 60 that steers the left steerable front wheel 11L and the right steerable front wheel 11R. The steering mechanism 60 includes a handle 25. The leaning vehicle 1 includes a leaning mechanism 61 that supports the left steerable front wheel 11L and the right steerable front wheel 11R, and also causes the left steerable front wheel 11L and the right steerable front wheel 11R to lean in accompaniment with leaning of the vehicle body 5. The leaning vehicle 1 includes the seat 3 on which an occupant sits. The leaning vehicle 1 includes a power unit 62 that generates a driving force for driving the rear wheel 12.

Referring to FIG. 1, the vehicle body 5 includes a head pipe 10, and a main frame 9 extending rearward from the head pipe 10 when viewed from the left direction or the right direction of the vehicle body 5. A center axis C21 of the head pipe 10 leans so that an upper portion thereof is located further at the rear side in the front-rear direction of the vehicle body 5 than a lower portion thereof when viewed from the left direction or the right direction of the vehicle body 5. Referring to FIG. 2, the center axis of the head pipe 10 extends in the up-down direction of the vehicle body 5 when viewed from the front direction or the rear direction of the vehicle body 5.

The configuration of the power unit 62 is not limited in any way. For example, the power unit 62 may include an internal combustion engine. Alternatively, the power unit 62 may include an electric motor. Further, the power unit 62 may be a hybrid unit that includes both an internal combustion engine and an electric motor.

In the present example, the leaning mechanism 61 is a double-wishbone type leaning mechanism. The leaning mechanism 61 includes a link member 66. The link member 66 includes a left support arm 30L that supports the left steerable front wheel 11L, and a right support arm 30R that supports the right steerable front wheel 11R. The left support arm 30L corresponds to a left link member of the present invention, and the right support arm 30R corresponds to a right link member of the present invention. The link member 66 is supported in a rotatable manner about an axis extending in the front-rear direction of the vehicle body 5 with respect to the vehicle body 5, and supports the left steerable front wheel 11L and the right steerable front wheel 11R. The leaning mechanism 61 causes the vehicle body 5, the left steerable front wheel 11L and the right steerable front wheel 11R to lean leftward of the leaning vehicle 1 when the leaning vehicle 1 turns left, and causes the vehicle body 5, the left steerable front wheel 11L and the right steerable front wheel 11R to lean rightward of the leaning vehicle 1 when the leaning vehicle 1 turns right.

The leaning mechanism 61 includes a center arm 34, a left cushion unit 35L and a right cushion unit 35R.

As described in the foregoing, the left support arm 30L and the right support arm 30R form the link member 66 which causes a relative position between the left steerable front wheel 11L and the right steerable front wheel 11R in the up-down direction of the vehicle body 5 to change in accordance with leaning of the vehicle body 5. The center arm 34 is supported by the vehicle body 5 in a swingable manner about an axis extending in the front-rear direction of the vehicle body 5. The center arm 34 also transmits an upward motion of the left steerable front wheel 11L to the right steerable front wheel 11R as a downward motion, and transmits an upward motion of the right steerable front wheel 11R to the left steerable front wheel 11L as a downward motion.

The left support arm 30L includes a left lower arm 32L, and a left upper arm 31L disposed at the upper side of the left lower arm 32L in the up-down direction of the vehicle body 5. The left lower arm 32L and the left upper arm 31L are disposed at the left side of a vehicle center line CL, in the left-right direction of the vehicle body 5. The description "vehicle center line CL" means a line that intersects with the center axis C21 of the head pipe 10, and that extends in the front-rear direction of the vehicle body 5.

Figure 4:
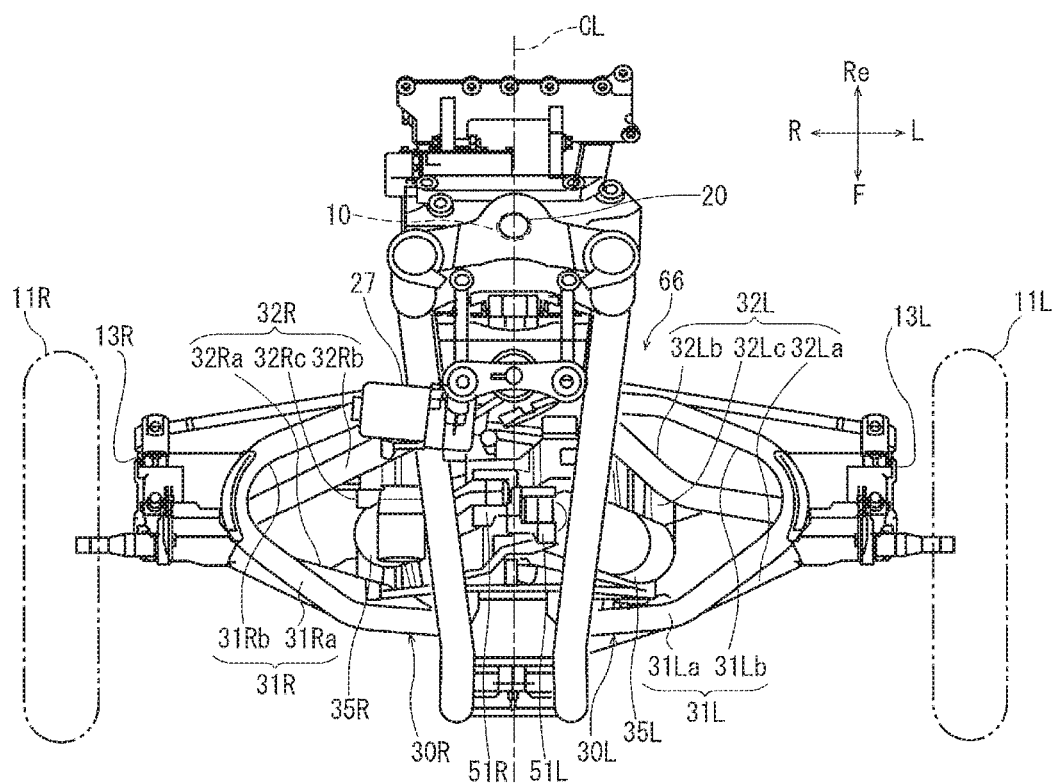
FIG. 4 is a view of a portion of the leaning vehicle when viewed along an axial direction of a head pipe.

Referring now to FIG. 4, the left lower arm 32L includes: a front half portion 32La; a rear half portion 32Lb positioned behind the front half portion 32La; and a crossbar 32Lc that connects the front half portion 32La and the rear half portion 32Lb with each other. The front half portion 32La and the rear half portion 32Lb are formed so that a distance between the front half portion 32La and the rear half portion 32Lb decreases as these portions extend leftward. A left end portion of each of the front half portion 32La and the rear half portion 32Lb are connected with each other. The crossbar 32Lc extends in the front-rear direction of the vehicle body 5. The left upper arm 31L includes a front half portion 31La, and a rear half portion 31Lb positioned behind the front half portion 31La. The front half portion 31La and the rear half portion 31Lb are formed so that a distance between the front half portion 31La and the rear half portion 31Lb decreases as these portions extend leftward. A left end portion of each of the front half portion 31La and the rear half portion 31Lb are connected with each other.

Referring again to FIG. 2, a right end portion of the left lower arm 32L and a right end portion of the left upper arm 31L are supported by the vehicle body 5 in a swingable (rotatable) upward and downward about first left axes H1L extending in the front-rear direction of the vehicle body 5. A left end portion of the left lower arm 32L and a left end portion of the left upper arm 31L are supported by a left knuckle arm 13L in a swingable (rotatable) upward and downward about axes H2 extending in the front-rear direction of the vehicle body 5.

The right support arm 30R has a shape which is bilaterally symmetrical with respect to the left support arm 30L with the vehicle center line CL as a boundary. The right support arm 30R includes a right lower arm 32R and a right upper arm 31R that is disposed at the upper side of the right lower arm 32R in the up-down direction of the vehicle body 5. The right lower arm 32R and the right upper arm 31R are disposed at the right side of the vehicle center line CL in the left-right direction of the vehicle body 5.

Referring again to FIG. 4, the right lower arm 32R includes: a front half portion 32Ra; a rear half portion 32Rb positioned behind the front half portion 32Ra; and a crossbar 32Rc that connects the front half portion 32Ra and the rear half portion 32Rb with each other. The front half portion 32Ra and the rear half portion 32Rb are formed so that a distance between the front half portion 32Ra and the rear half portion 32Rb decreases as these portions extend rightward. A right end portion of each of the front half portion 32Ra and the rear half portion 32Rb are connected with each other. The crossbar 32Rc extends in the front-rear direction. The right upper arm 31R includes a front half portion 31Ra, and a rear half portion 31Rb positioned behind the front half portion 31Ra. The front half portion 31Ra and the rear half portion 31Rb are formed so that a distance between the front half portion 31Ra and the rear half portion 31Rb decreases as these portions extend rightward. A right end portion of each of the front half portion 31Ra and the rear half portion 31Rb are connected with each other.

Referring again to FIG. 2, a left end portion of the right lower arm 32R and a left end portion of the right upper arm 31R are supported by the vehicle body 5 in a swingable upward and downward about first right axes H1R extending in the front-rear direction of the vehicle body 5. A right end portion of the right lower arm 32R and a right end portion of the right upper arm 31R are supported by a right knuckle arm 13R in a swingable upward and downward about axes H2 extending in the front-rear direction of the vehicle body 5.

The left steerable front wheel 11L is disposed at the left side of the vehicle center line CL in the left-right direction of the vehicle body 5. The left steerable front wheel 11L is rotatably supported by the left knuckle arm 13L. The right steerable front wheel 11R is disposed at the right side of the vehicle center line CL in the left-right direction of the vehicle body 5. The right steerable front wheel 11R is rotatably supported by the right knuckle arm 13R.

Referring once more to FIG. 2, the center arm 34 is formed in a plate shape whose longitudinal direction extends in the up-down direction of the leaning vehicle 1. However, the shape of the center arm 34 is not particularly limited. The center arm 34 may be formed in a plate shape whose longitudinal direction extends in the left-right direction of the vehicle. The center arm 34 may be a rod shape, and not a plate shape. The center arm 34 may be a shape that is obtained by combining a plurality of members that have a plate shape or a rod shape. A lower end portion 34a of the center arm 34 is supported by the vehicle body 5 in a freely swingable manner about an axis H3 extending in the front-rear direction of the vehicle body 5.

Figure 5:
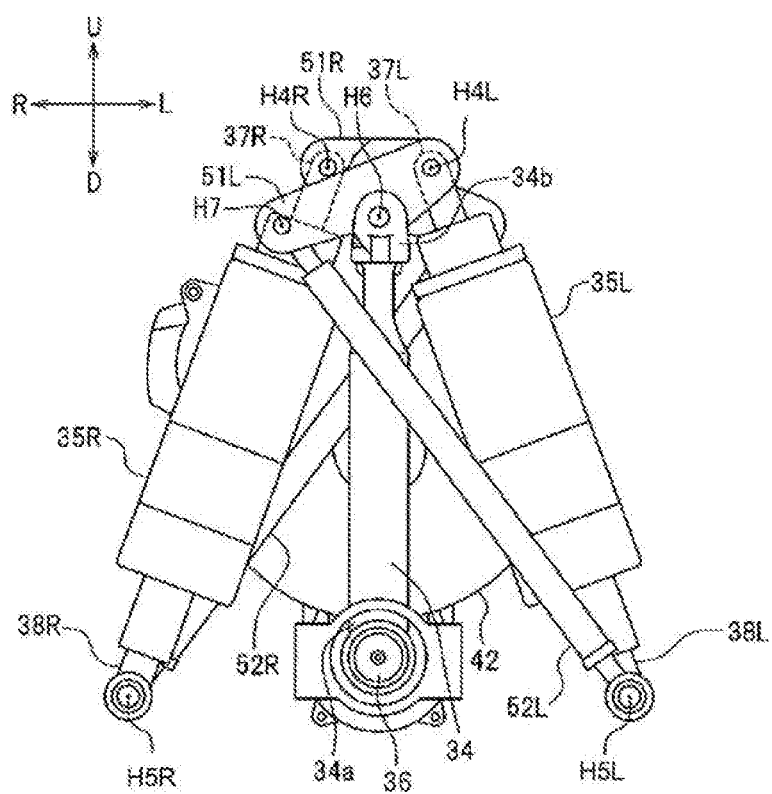
FIG. 5 is the front view of a portion of a suspension.
Figure 6:
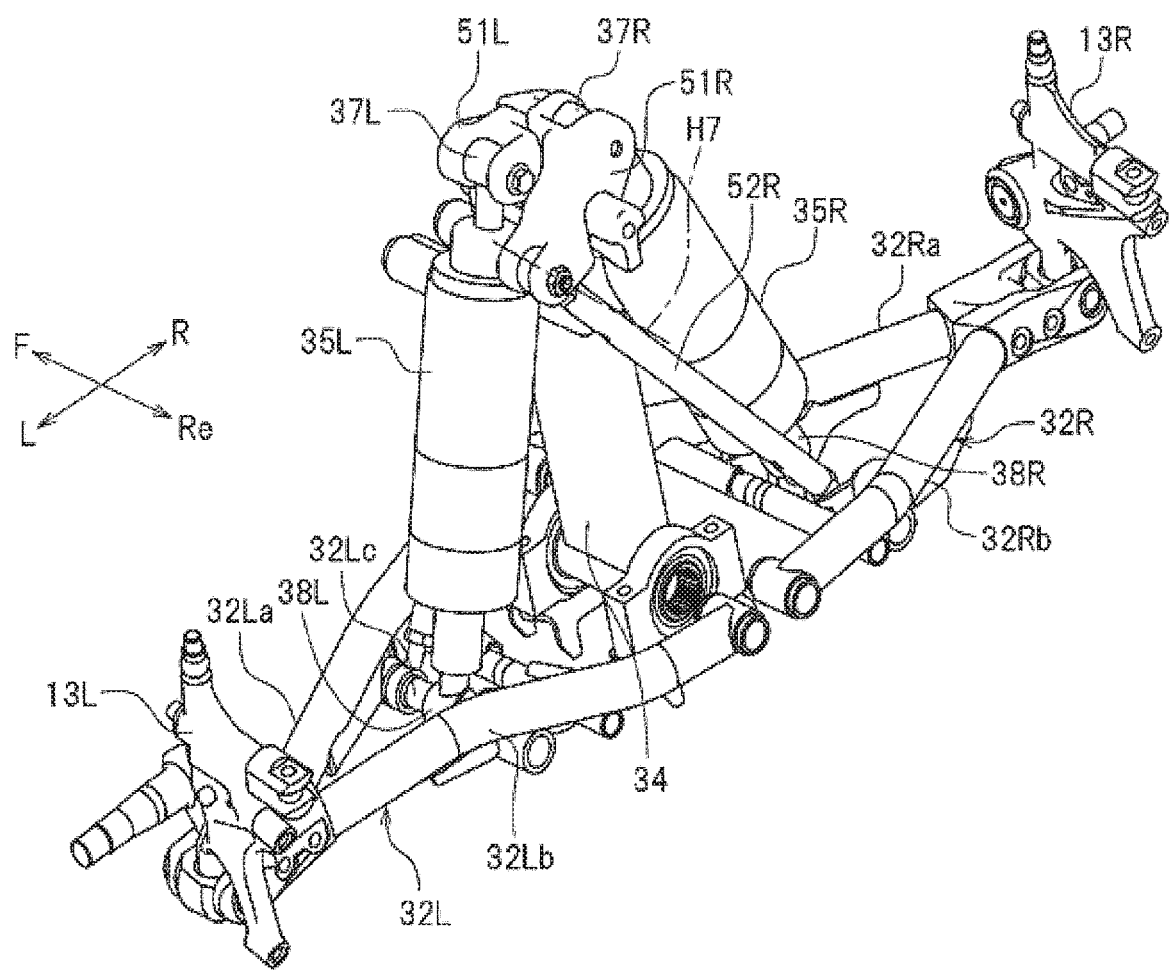
FIG. 6 is a perspective view of a portion of the suspension.

Referring to FIG. 5, a first left arm 51L and a first right arm 51R are supported by an upper end portion 34b of the center arm 34 in a swingable manner about an axis H6 extending in the front-rear direction of the vehicle body 5. Referring to FIG. 6, the first left arm 51L is disposed at the front side of the first right arm 51R in the front-rear direction of the vehicle body 5. However, the first left arm 51L may be disposed behind the first right arm 51R in the front-rear direction of the vehicle body 5.

A second left arm 52L is connected to the first left arm 51L, and a second right arm 52R is connected to the first right arm 51R. The second left arm 52L and the second right arm 52R are formed into a rod shape. Referring to FIG. 5, an upper end portion of the second left arm 52L is supported by the first left arm 51L in a swingable manner about an axis H7 extending in the front-rear direction of the vehicle body 5. A lower end portion of the second left arm 52L is supported by the left lower arm 32L of the left support arm 30L in a swingable manner about an axis H5L (see also axes H5 in FIG. 2) extending in the front-rear direction of the vehicle body 5. The lower end portion of the second left arm 52L is supported by the crossbar 32Lc of the left lower arm 32L. The lower end portion of the second left arm 52L may be supported by the left upper arm 31L of the left support arm 30L. An upper end portion of the second right arm 52R is supported by the first right arm 51R in a freely swingable manner about an axis H7 extending in the front-rear direction of the vehicle body 5. A lower end portion of the second right arm 52R is supported by the right lower arm 32R of the right support arm 30R in a freely swingable manner about an axis H5R extending in the front-rear direction of the vehicle body 5. The lower end portion of the second right arm 52R is supported by the crossbar 32Rc of the right lower arm 32R. The lower end portion of the second right arm 52R may be supported by the right upper arm 31R of the right support arm 30R.

The left cushion unit 35L and the right cushion unit 35R each include a spring and a damper. The left cushion unit 35L and the right cushion unit 35R each include a spring function and an attenuation function. Since the structure of the left cushion unit 35L and the right cushion unit 35R is well known, a detailed description of the left cushion unit 35L and the right cushion unit 35R is omitted here. In the drawing, illustration of the spring is omitted. The cushion units 35L and 35R shown in the present example are telescopic-type units that perform a linear reciprocating motion. However, the cushion units 35L and 35R are not limited to a telescopic-type unit. The cushion units 35L and 35R may be vane-type units that perform an arcuate reciprocating motion.

Referring to FIG. 5, the left cushion unit 35L includes a first end portion 38L and a second end portion 37L. The first end portion 38L is supported by the left lower arm 32L of the left support arm 30L in a swingable manner about the axis H5L extending in the front-rear direction of the vehicle body 5. The first end portion 38L is supported by the crossbar 32Lc of the left lower arm 32L. However, the first end portion 38L may be supported by the left upper arm 31L of the left support arm 30L. The second end portion 37L is supported by the first left arm 51L in a swingable manner about an axis H4L extending in the front-rear direction of the vehicle body 5. In a state where the leaning vehicle 1 is stopped upright on a horizontal plane in a non-steering state (hereinafter, referred to as an "upright non-steering state"), when the leaning vehicle 1 is viewed from the rear direction, the axis H4L is positioned at the left side of the axis H6, and the axis H7 is positioned at the right side of the axis H6. In the upright non-steering state, when the leaning vehicle 1 is viewed from the front direction or the rear direction, either one of the left cushion unit 35L and the second left arm 52L overlaps with the center arm 34. In this embodiment, as viewed from the front direction or the rear direction of the leaning vehicle 1, the second left arm 52L overlaps with the center arm 34. However, the left cushion unit 35L may overlap with the center arm 34, as viewed from the front direction or the rear direction of the vehicle.

The right cushion unit 35R includes a first end portion 38R and a second end portion 37R. The first end portion 38R is supported by the right lower arm 32R of the right support arm 30R in a swingable manner about the axis H5R extending in the front-rear direction of the vehicle body 5. The first end portion 38R is supported by the crossbar 32Rc of the right lower arm 32R. However, the first end portion 38R may be supported by the right upper arm 31R of the right support arm 30R. The second end portion 37R is supported by the first right arm 51R in a freely swingable manner about an axis H4R extending in the front-rear direction of the vehicle body 5. In the upright non-steering state, when the leaning vehicle 1 is viewed from the front direction or the rear direction, either one of the right cushion unit 35R and the second right arm 52R overlaps with the center arm 34. In this embodiment, as viewed from the front direction or the rear direction of the leaning vehicle 1, the second right arm 52R overlaps with the center arm 34. However, the right cushion unit 35R may overlap with the center arm 34, as viewed from the front direction or the rear direction of the leaning vehicle 1.

Next, the steering mechanism 60 will be described. The steering mechanism 60 includes the handle 25, and is capable of steering the left steerable front wheel 11L and the right steerable front wheel 11R by means of an operation of the handle 25.

The steering mechanism 60 will be described referring to FIG. 7, FIG. 8 and FIG. 9. The steering mechanism 60 includes a steering shaft 20 that is supported by the vehicle body 5 in a rotatable manner with respect to the vehicle body 5. Specifically, the steering shaft 20 is rotatably supported by the head pipe 10 of the vehicle body 5. The steering mechanism 60 includes the handle 25 that is fixed to the steering shaft 20. The steering mechanism 60 includes a tie rod 26 that connects the steering shaft 20 with the left steerable front wheel 11L and the right steerable front wheel 11R.

The steering shaft 20 includes a first center steering shaft 21 that is supported by the vehicle body 5 in a rotatable manner with respect to the vehicle body 5. The center axis of the head pipe 10 and the center of rotation of the first center steering shaft 21 are identical. The first center steering shaft 21 is provided at the center of the leaning vehicle 1 in the left-right direction of the leaning vehicle 1.

The steering shaft 20 includes a second center steering shaft 22 that is disposed at the front side of the first center steering shaft 21 in the front-rear direction of the vehicle body 5. The second center steering shaft 22 is provided at the center of the leaning vehicle 1 in the left-right direction of the leaning vehicle 1. The second center steering shaft 22 is supported by the vehicle body 5 in a rotatable manner with respect to the vehicle body 5.

The steering mechanism 60 includes a center steering shaft rotation interlocking mechanism 230. The center steering shaft rotation interlocking mechanism 230 interlocks rotation of the first center steering shaft 21 with rotation of the second center steering shaft 22. Referring to FIG. 7 and FIG. 8, the center steering shaft rotation interlocking mechanism 230 includes a first mounting member 21d. The first mounting member 21d is non-rotatably mounted at a lower portion of the first center steering shaft 21. In this case, the term "lower portion of the first center steering shaft" means, when the first center steering shaft 21 is divided in two in the rotational axis direction, a region on the lower side of the center of the first center steering shaft 21 in the up-down direction of the vehicle body 5. In the present example, the first mounting member 21d is a lower cross member (lower crown). In the present example, the first mounting member 21d is a plate-shaped or rod-shaped member that, when the leaning vehicle 1 is upright on a horizontal plane and stopped in a non-steering state, extends in the left-right direction of the leaning vehicle 1.

Figure 7:
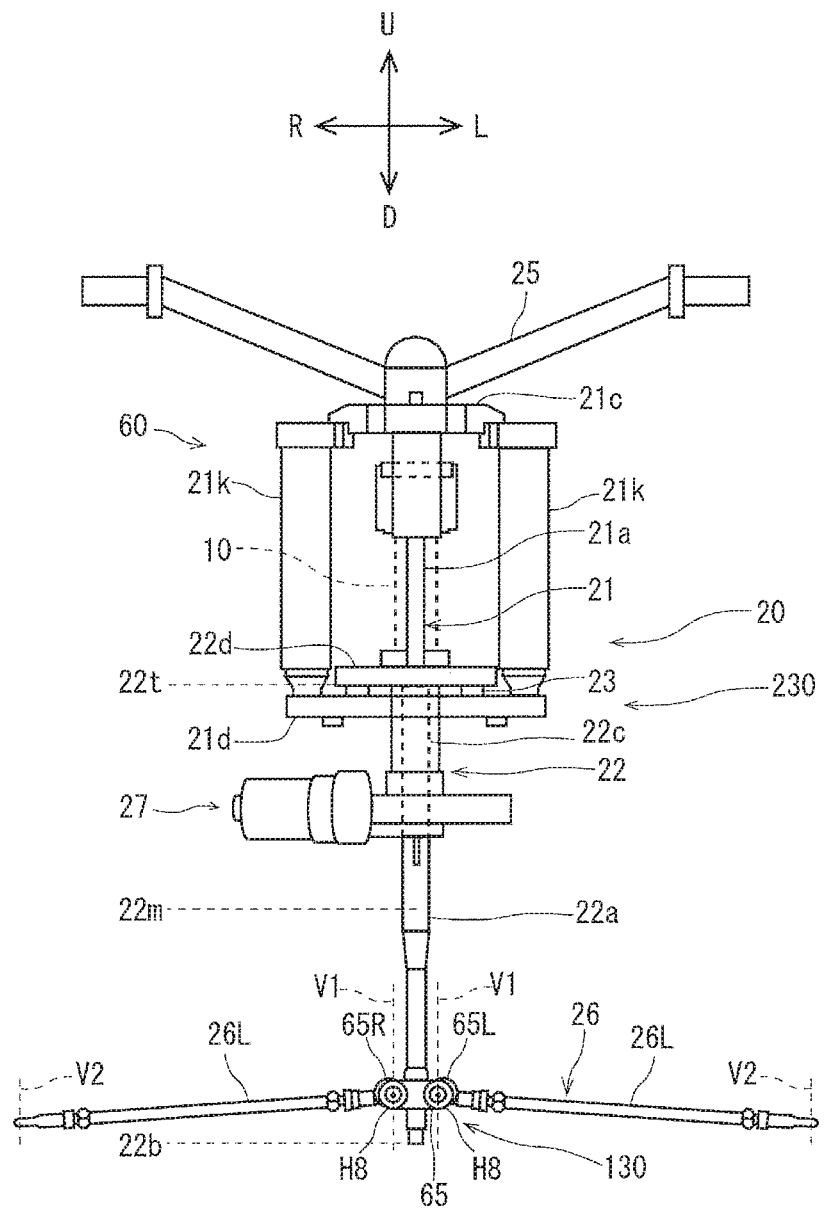
FIG. 7 is the front view of a steering mechanism.
Figure 8:
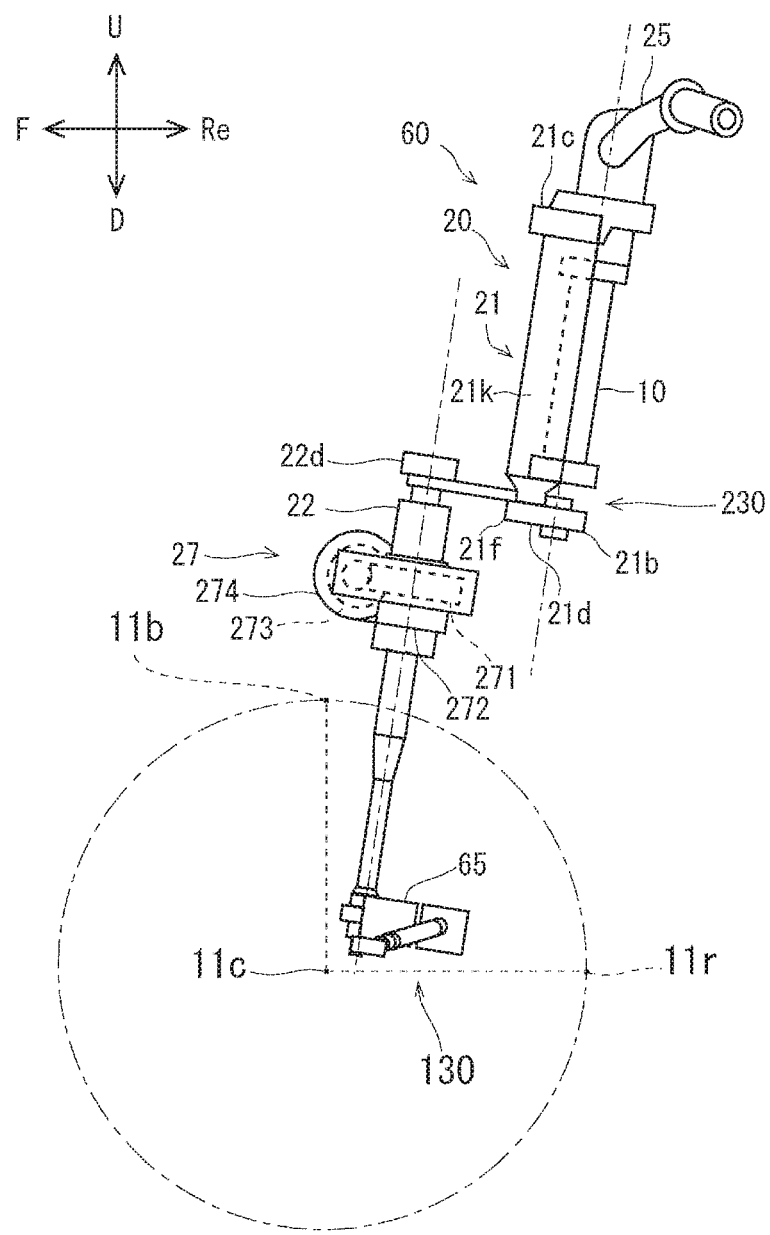
FIG. 8 is a side view of the steering mechanism.
Figure 9:
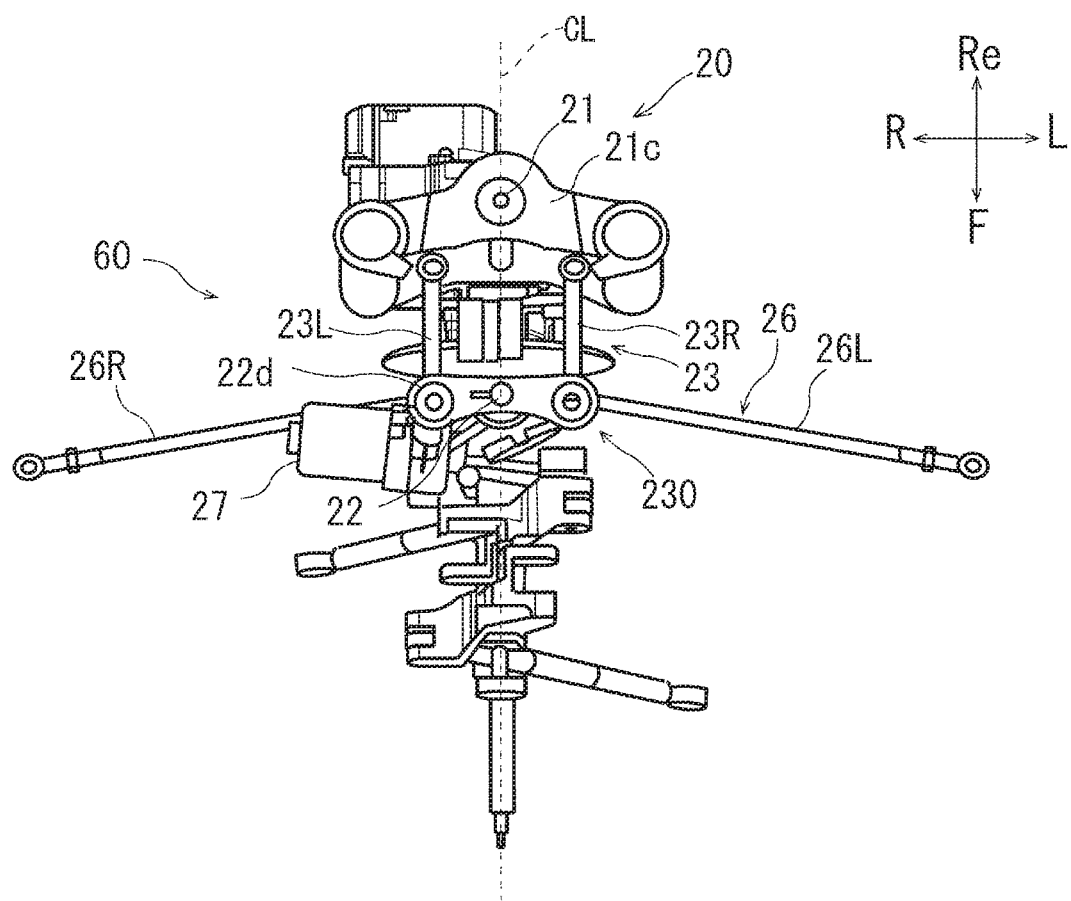
FIG. 9 is a plan view of the steering mechanism.

Referring to FIG. 7 to FIG. 9, the center steering shaft rotation interlocking mechanism 230 includes a second mounting member 22d. The second mounting member 22d is non-rotatably mounted at an upper portion of the second center steering shaft 22. In this case, the term "upper portion of the second center steering shaft" means, when the second center steering shaft 22 is divided in two in the rotational axis direction, a region on the upper side of the center of the second center steering shaft 22 in the up-down direction of the vehicle body 5. In the present example, the second mounting member 22d is a bracket. In the present example, the second mounting member 22d is a plate-shaped or rod-shaped member that, when the leaning vehicle 1 is upright on a horizontal plane and stopped in a non-steering state, extends in the left-right direction of the leaning vehicle 1.

The center steering shaft rotation interlocking mechanism 230 includes a connection member 23. The connection member 23 connects the first mounting member 21d and the second mounting member 22d. By this means, the connection member 23 connects the first center steering shaft 21 and the second center steering shaft 22. Referring to FIG. 9, in the present example, the connection member 23 includes a pair of members 23L and 23R.

Referring again to FIG. 7, the first center steering shaft 21 includes a main shaft 21a. The main shaft 21a is rotatably supported inside the head pipe 10 of the vehicle body 5. The first center steering shaft 21 includes a pair of side pipes 21k. The pair of side pipes 21k are disposed at the left side and right side of the main shaft 21a in the left-right direction of the vehicle body 5. The first center steering shaft 21 includes an upper cross member 21c. The upper cross member 21c connects the main shaft 21a and an upper portion of the side pipes 21k. The first mounting member 21d that corresponds to a lower cross member connects the main shaft 21a and a lower portion of the side pipes 21k. However, the side pipes 21k and the upper cross member 21c are not necessarily required, and may be omitted.

The second center steering shaft 22 includes a main shaft 22c. The second mounting member 22d is non-rotatably mounted at an upper portion of the main shaft 22c. As described above, the connection member 23 is formed of a pair of left and right rod-shaped or plate-shaped members that are arranged side by side in the left-right direction of the vehicle body 5. The connection member 23 connects the first mounting member 21d and the second mounting member 22d with each other.

Referring to FIG. 9, the connection member 23 includes the pair of left and right members 23L and 23R. The member 23L is disposed at the left side of the vehicle center line CL in the left-right direction of the vehicle body 5. The member 23R is disposed at the right side of the vehicle center line CL in the left-right direction of the vehicle body 5. However, the connection member 23 may include the member 23L that, when the leaning vehicle 1 is viewed from the up direction, is disposed at the left side of the vehicle center line CL in the left-right direction of the vehicle body 5, and need not include the member 23R disposed at the right side of the center line CL. Further, the connection member 23 may include the member 23R that, when the leaning vehicle 1 is viewed from the up direction, is disposed at the right side of the center line CL in the left-right direction of the vehicle body 5, and need not include the member 23L disposed at the left side of the center line CL. In short, the connection member 23 may include either only member 23L without member 23R or only member 23R without member 23L.

The steering mechanism 60 includes a left-right rotation interlocking mechanism 130. Referring to FIG. 8, the left-right rotation interlocking mechanism 130 includes an arm member 65. The arm member 65 is provided at the lower portion of the second center steering shaft 22. When the second center steering shaft 22 rotates around the rotational axis of the second center steering shaft 22, the arm member 65 rotates around the rotational axis together with the second center steering shaft 22.

Referring to FIG. 7, the arm member 65 includes a left arm portion 65L that is disposed at the left side of the vehicle body 5, and a right arm portion 65R that is disposed at the right side of the vehicle body 5. The left-right rotation interlocking mechanism 130 includes the tie rod 26. The tie rod 26 is mounted on the arm member 65. The tie rod 26 is displaceable leftward and rightward of the vehicle body 5. The tie rod 26 includes a left tie rod 26L and a right tie rod 26R. The left tie rod 26L connects the second center steering shaft 22 and the left steerable front wheel 11L with each other. The left tie rod 26L is connected to the lower portion of the second center steering shaft 22 by way of the arm member 65. More specifically, a right end portion of the left tie rod 26L is connected to the left arm portion 65L, and a left end portion of the left tie rod 26L is connected to the left steerable front wheel 11L by way of the left knuckle arm 13L. The right tie rod 26R connects the second center steering shaft 22 and the right steerable front wheel 11R with each other. The right tie rod 26R is connected to the lower portion of the second center steering shaft 22 by way of the arm member 65. More specifically, a left end portion of the right tie rod 26R is connected to the right arm portion 65R, and a right end portion of the right tie rod 26R is connected to the right steerable front wheel 11R by way of the right knuckle arm 13R.

Referring to FIG. 7 and FIG. 8, in the present example, the arm member 65 is mounted at the lower end portion of the second center steering shaft 22. However, it is sufficient that the arm member 13 is provided at the lower portion of the second center steering shaft 22 and rotates together with the second center steering shaft 22.

The right end portion of the left tie rod 26L and the left end portion of the right tie rod 26R are supported in a swingable manner by the arm member 65 about axes V1 extending in the up-down direction of the vehicle body 5. Further, the right end portion of the left tie rod 26L and the left end portion of the right tie rod 26R are supported in a swingable manner by the arm member 65 about axes H8 extending in the front-rear direction of the vehicle body 5.

Referring again to FIG. 2, the left end portion of the left tie rod 26L is supported in a swingable manner by the left knuckle arm 13L about an axis V2 extending in the up-down direction of the vehicle body 5. The left end portion of the left tie rod 26L is also supported in a swingable manner by the left knuckle arm 13L about an axis H9 extending in the front-rear direction of the vehicle body 5.

The right end portion of the right tie rod 26R is supported in a swingable manner by the right knuckle arm 13R about an axis V2 extending in the up-down direction of the vehicle body 5. The right end portion of the right tie rod 26R is also supported in a swingable manner by the right knuckle arm 13R about an axis H9 extending in the front-rear direction of the vehicle body 5.

The leaning vehicle 1 includes an actuator 27. The actuator 27 applies a steering force to the left steerable front wheel 11L and the right steerable front wheel 11R.

Referring to FIG. 7, the actuator 27 is mounted on the steering shaft 20. The actuator 27 plays a role of assisting steering performed by an occupant. A torque sensor that is not shown in the drawing is provided on the steering shaft 20. The torque sensor detects a steering force, that is, a torque, applied to the steering shaft 20 by the occupant. The actuator 27 outputs a driving force corresponding to a torque detected by the above-mentioned torque sensor.

In FIG. 7 and FIG. 8, the actuator 27 is mounted on the steering shaft 20 at a portion thereof that is above an intermediate position 22m that is between an upper end 22t and a lower end 22b of the second center steering shaft 22. The actuator 27 can be mounted on either one of the first center steering shaft 21 and the second center steering shaft 22. In this embodiment, the actuator 27 is mounted on the second center steering shaft 22.

Referring to FIG. 2, the actuator 27 is disposed at a position that is above the leaning mechanism 61 in the up-down direction of the vehicle body 5. Referring to FIG. 4, the actuator 27 is disposed at a position that overlaps with the link member 66 in the up-down direction of the vehicle body 5.

In FIG. 8, when the leaning vehicle 1 is stopped in the upright non-steering state, the actuator 27 is disposed at a position that is below the lower end 21b of the first center steering shaft 21. Further, in the upright non-steering state, the actuator 27 is disposed further at the front side than a front end 21f of the first center steering shaft 21. However, the arrangement position of the actuator 27 is not limited thereto.

When the vehicle body 5 is in the upright non-steering state, the actuator 27 is disposed at a position that is above an upper end 11t of the left steerable front wheel 11L and the right steerable front wheel 11R. In the upright non-steering state, the actuator 27 is disposed further at the front side than a rear end 11r of the left steerable front wheel 11L and the right steerable front wheel 11R. In the upright non-steering state, the actuator 27 is disposed further at the rear side than a center 11c of the left steerable front wheel 11L and the right steerable front wheel 11R.

However, the arrangement positions of the actuator 27 are not limited to the above-described positions. The arrangement positions of the actuator 27 will be described later.

Referring to FIG. 1, the leaning vehicle 1 includes a side stand 67 which maintains the vehicle body 5 in a leaning posture. The side stand 67 is supported by the vehicle body 5. The side stand 67 is disposed at the left side of the vehicle center line CL. The side stand 67 and a driving portion 273 (FIG. 13) of the actuator 27 are respectively disposed at the left side and the right side of the center of the vehicle body 5 in the left-right direction. The side stand 67 and the driving portion 273 may be respectively disposed at the right side and the left side of the center of the vehicle body 5 in the left-right direction.

The leaning vehicle 1 according to this embodiment further includes an actuator 33 that generates a driving force that causes the vehicle body 5 to lean. The actuator 33 applies a rotational force about a first left axis H1L to the left support arm 30L. The actuator 33 also applies a rotational force about a first right axis H1R to the right support arm 30R. By this means, the actuator 33 changes a relative position between the left steerable front wheel 11L and the right steerable front wheel 11R in the up-down direction of the vehicle body 5 in accordance with leaning of the vehicle body 5.

Figure 10:
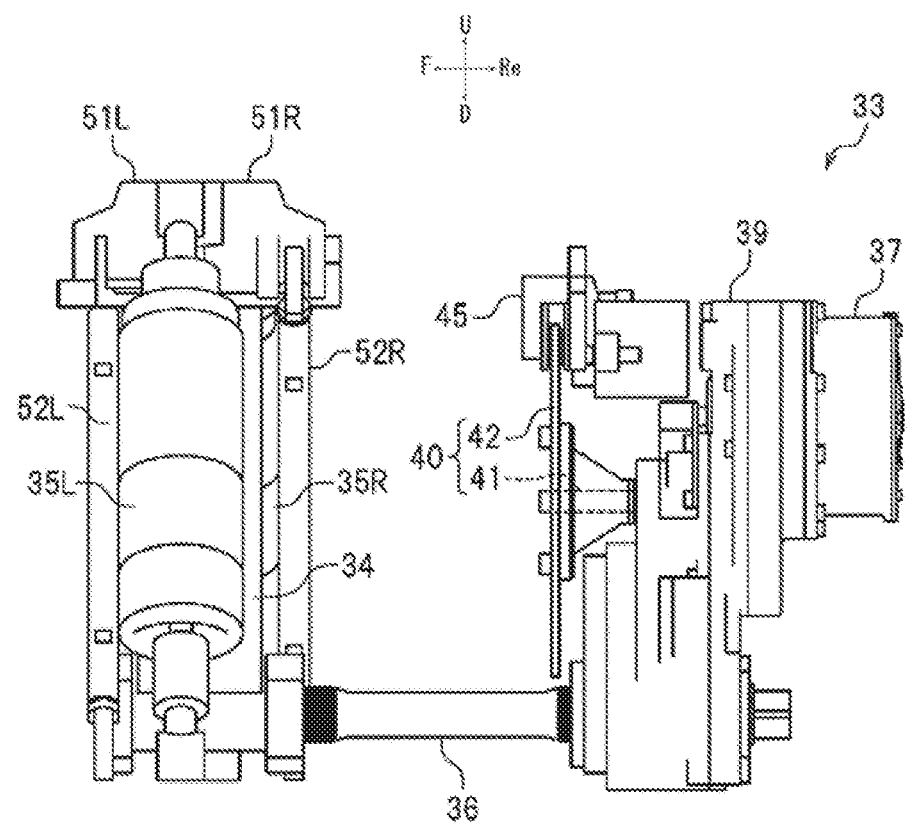
FIG. 10 is a side view of a portion of an actuator and the suspension.

The actuator 33 will now be described further referring to FIG. 10. The actuator 33 includes a motor 37, a speed reduction mechanism 39 that reduces the rotational speed of the motor 37, and a brake member 40 that restricts rotation of the motor 37. A connecting shaft 36 is connected to the actuator 33. The motor 37, the speed reduction mechanism 39 and the brake member 40 are formed into one integral body. The connecting shaft 36 extends forward in the front-rear direction of the vehicle body 5 from the actuator 33. The connecting shaft 36 is connected to the center arm 34.

The brake member 40 includes a brake shaft 41 that is connected to the speed reduction mechanism 39, and a brake disk 42 that is fixed to the brake shaft 41. A brake caliper 45 is supported by the vehicle body 5. The brake caliper 45 restricts rotation of the motor 37 by holding the brake disk 42.

Figure 11:
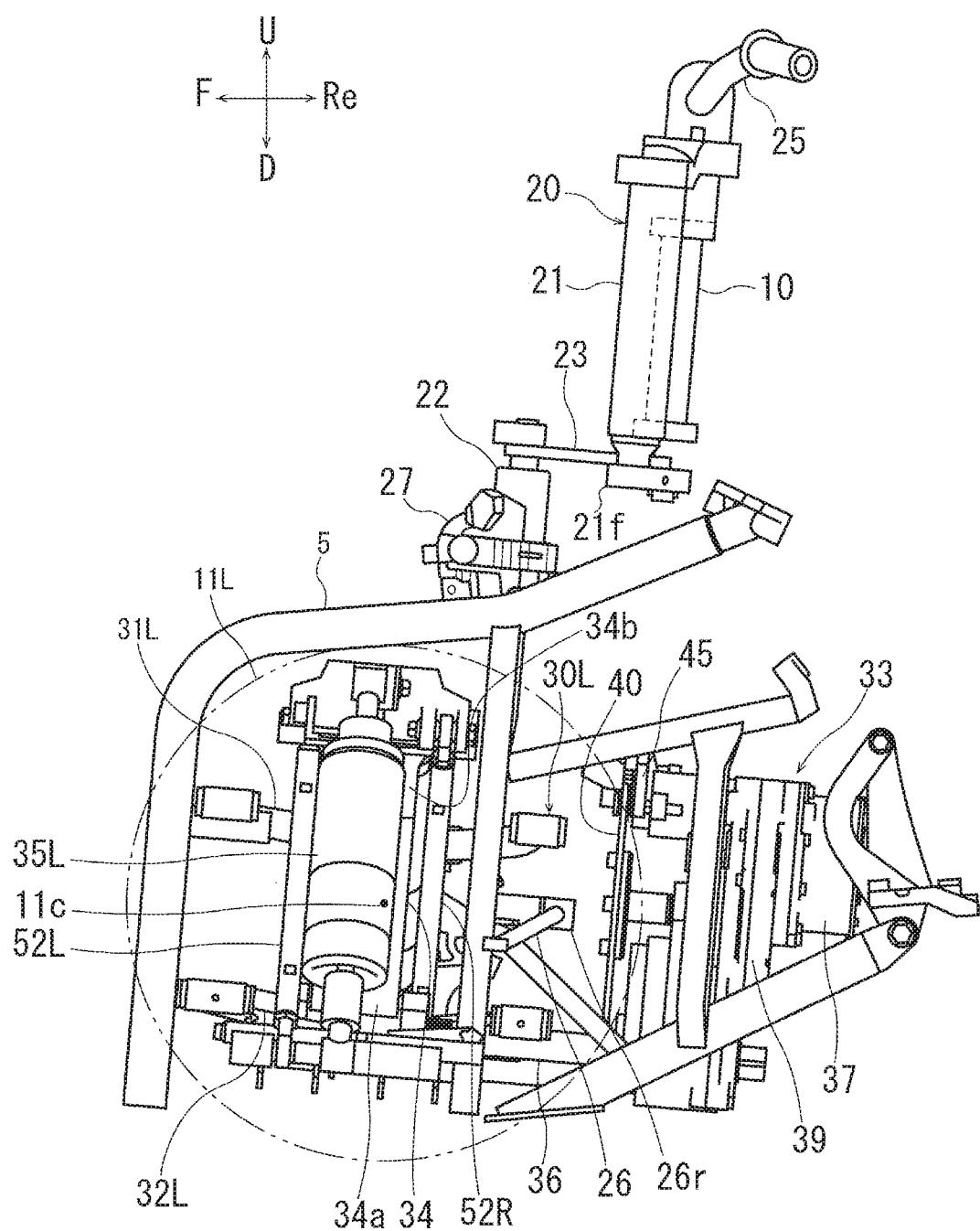
FIG. 11 is a side view of a portion of the leaning vehicle.

Referring to FIG. 11, the actuator 33 is supported by the vehicle body 5. At least a part of the actuator 33 is disposed at the rear side of the left support arm 30L and the right support arm 30R in the front-rear direction of the vehicle body 5. In this embodiment, the whole actuator 33 is disposed at the rear side of the left support arm 30L and the right support arm 30R in the front-rear direction of the vehicle body 5. At least a part of the actuator 33 is disposed at the rear side of the center 11c of the left steerable front wheel 11L and the right steerable front wheel 11R in the front-rear direction of the vehicle body 5. In this embodiment, the whole actuator 33 is disposed at the rear side of the center 11c of the left steerable front wheel 11L and the right steerable front wheel 11R in the front-rear direction of the vehicle body 5. At least a part of the actuator 33 is disposed at the rear side of a rear end 26r of the tie rod 26 in the front-rear direction of the vehicle body 5. At least a part of the actuator 33 is disposed at the rear side of the front end 21f of the first center steering shaft 21 in the front-rear direction of the vehicle body 5.

[Detailed Description of Actuator 27]

The actuator 27 will now be described in further detail.

Figure 12:
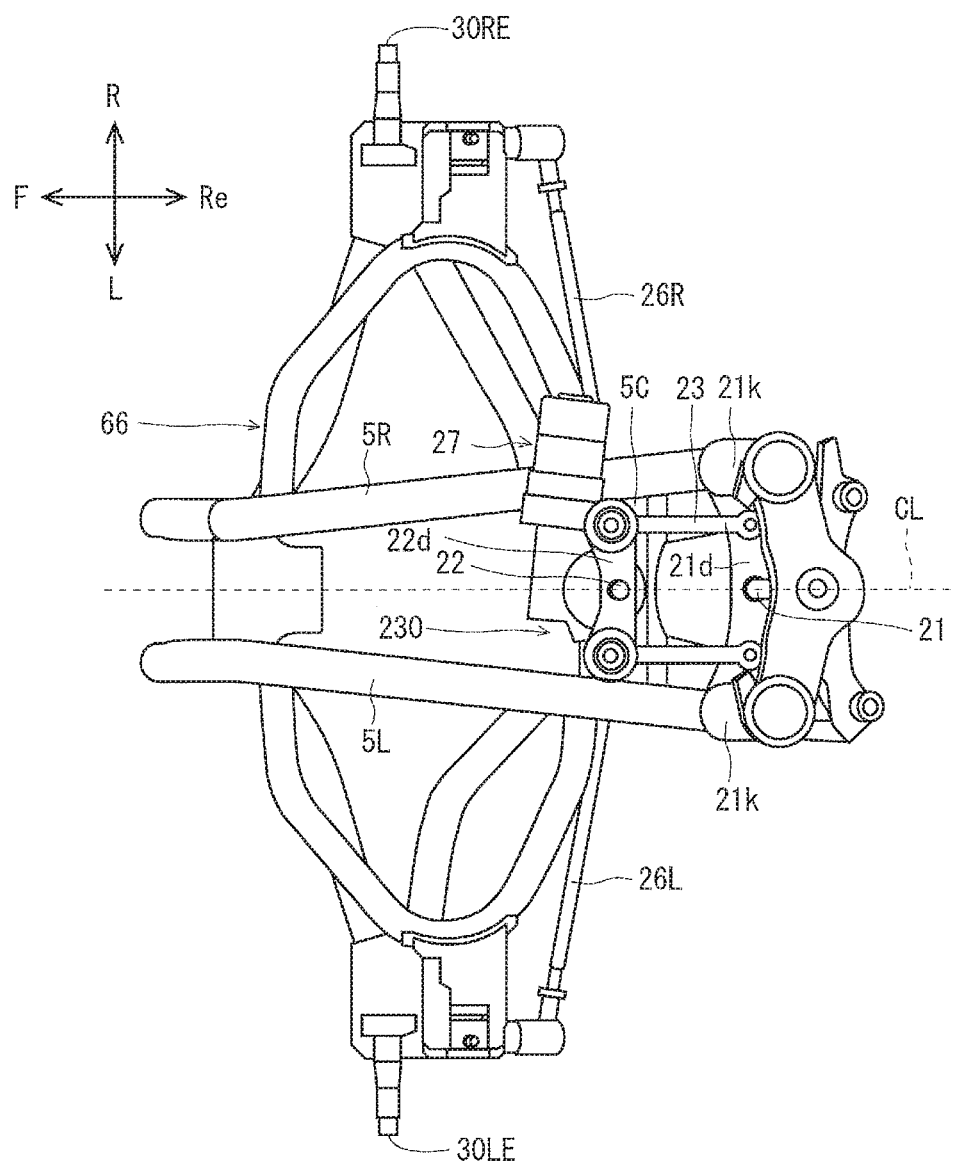
FIG. 12 is a plan view of a portion in the vicinity of a second center steering shaft of the leaning vehicle when the leaning vehicle is viewed from the up direction of the vehicle body.

FIG. 12 is a plan view of a portion in the vicinity of the second center steering shaft 22 of the leaning vehicle 1 as viewed from the up direction or the down direction of the vehicle body 5. Referring to FIG. 12, the vehicle body 5 includes a left-front vehicle body frame 5L and a right-front vehicle body frame 5R. The left-front vehicle body frame 5L is disposed at the left side of the vehicle center line CL in the left-right direction of the vehicle body 5. The right-front vehicle body frame 5R is disposed at the right side of the vehicle center line CL in the left-right direction of the vehicle body 5. The vehicle body 5 includes a cross member 5C. The cross member 5C is disposed between the left-front vehicle body frame 5L and the right-front vehicle body frame 5R. A left end portion of the cross member 5C is fixed to the left-front vehicle body frame 5L. A right end portion of the cross member 5C is fixed to the right-front vehicle body frame 5R. The second center steering shaft 22 is disposed at a front portion in the front-rear direction of the vehicle body 5 of the cross member 5C.

Figure 13:
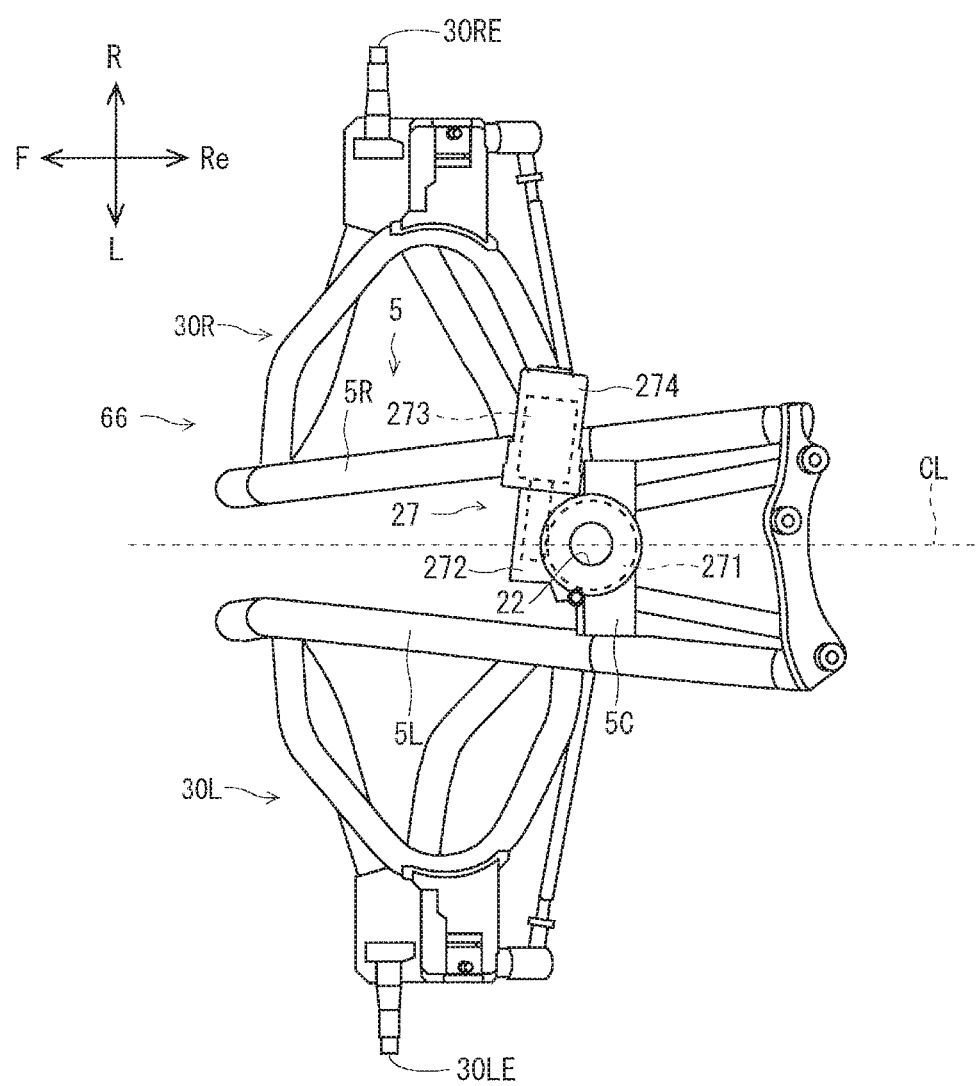
FIG. 13 is a plan view of the portion illustrated in FIG. 12, from which a left-right rotation interlocking mechanism shown in FIG. 12 is omitted.

FIG. 13 is a plan view of the same portion as shown in FIG. 12 except that illustration of the center steering shaft rotation interlocking mechanism 230 is omitted from FIG. 13. Referring to FIG. 13, the actuator 27 includes a shaft mounting portion 271. In FIG. 13, the shaft mounting portion 271 is non-rotatably mounted on the second center steering shaft 22. In the present example, the shaft mounting portion 271 is a worm wheel. The shaft mounting portion 271 is disposed at the same axis as the second center steering shaft 22.

In FIG. 13, the shaft mounting portion 271 is non-rotatably mounted on the second center steering shaft 22. However, the shaft mounting portion 271 may be non-rotatably mounted on the first center steering shaft 21. It is sufficient that the shaft mounting portion 271 is non-rotatably mounted on the first center steering shaft 21 or the second center steering shaft 22.

The actuator 27 includes a vehicle body mounting portion 272. The vehicle body mounting portion 272 is non-rotatably mounted on the vehicle body 5. In FIG. 13, the vehicle body mounting portion 272 is non-rotatably mounted on the cross member 5C of the vehicle body 5. The vehicle body mounting portion 272 may be fastened by screwing to the vehicle body 5. The vehicle body mounting portion 272 may be non-rotatably mounted on the vehicle body 5 by other means than fastening by screwing. Further, the vehicle body mounting portion 272 may be non-rotatably mounted on another portion of the vehicle body 5 that is different to the cross member 5C.

The actuator 27 includes the driving portion 273. The driving portion 273 applies a force to the shaft mounting portion 271. In the present example, the driving portion 273 is an electric motor which has a cylindrical worm gear. The worm gear of the driving portion 273 meshes with the shaft mounting portion 271 that is a worm wheel.

The driving portion 273 is provided between the shaft mounting portion 271 and the vehicle body mounting portion 272. In the present example, the driving portion 273 is non-rotatably mounted on the vehicle body 5 by way of the vehicle body mounting portion 272. A portion of the driving portion 273 contacts the shaft mounting portion 271, and applies a force to the shaft mounting portion 271.

The driving portion 273 may be mounted directly onto the vehicle body mounting portion 272. The driving portion 273 may also be mounted on the vehicle body mounting portion 272 indirectly by way of an unshown bracket or the like.

The actuator 27 further includes a case portion 274. The case portion 274 covers at least one of at least a part of the shaft mounting portion 271, at least a part of the vehicle body mounting portion 272, and at least a part of the driving portion 273. In the present example, the case portion 274 covers the driving portion 273. Further, in the present example, the vehicle body mounting portion 272 covers the shaft mounting portion 271 (worm gear). Therefore, the vehicle body mounting portion 272 also functions as the case portion 274.

Referring to FIG. 13, when the leaning vehicle 1 is upright on a horizontal plane and stopped in a non-steering state, as viewed from the up direction of the vehicle body 5, the shaft mounting portion 271, the vehicle body mounting portion 272, the driving portion 273 and the case portion 274 are provided between a left end 30LE and a right end 30RE of the link member 66 (left support arm 30L and right support arm 30R) in the left-right direction of the vehicle body 5.

Figure 14A:
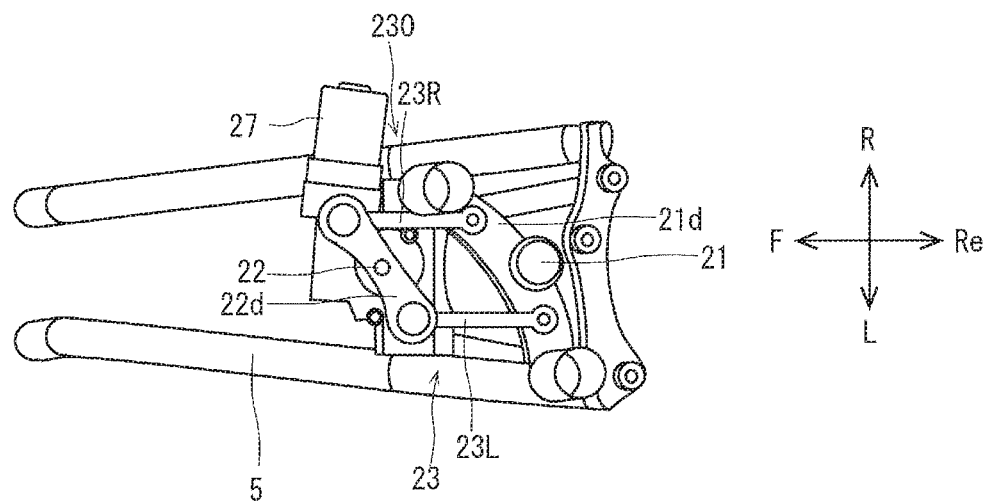
FIG. 14A is a view illustrating the arrangement position of a center steering shaft rotation interlocking mechanism in a case where the leaning vehicle turns left with the maximum turning angle.
Figure 14B:
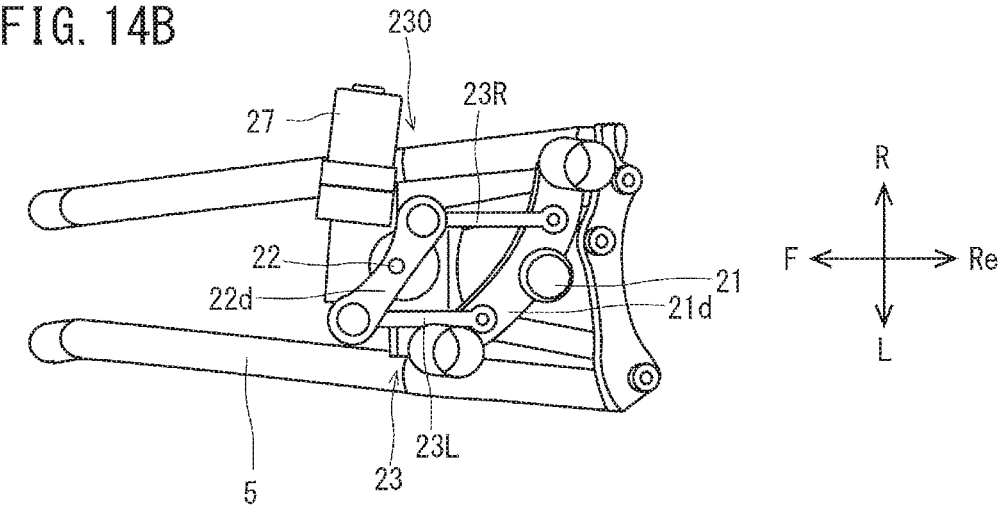
FIG. 14B is a view illustrating the arrangement position of the center steering shaft rotation interlocking mechanism in a case where the leaning vehicle turns right with the maximum turning angle.
Figure 14C:
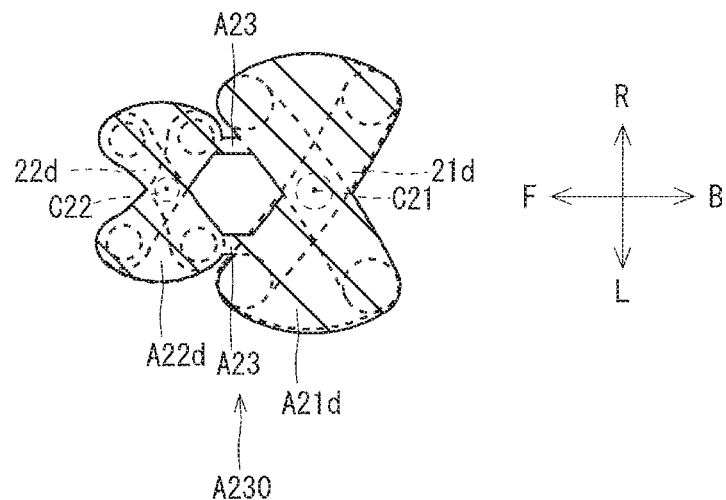
FIG. 14C is a schematic diagram illustrating a movable range of the center steering shaft rotation interlocking mechanism, that includes a first mounting member and a second mounting member.

FIG. 14A to FIG. 14C are views that illustrate a movable range of the center steering shaft rotation interlocking mechanism 230 when the leaning vehicle 1 is viewed from the up direction of the vehicle body 5. FIG. 14A is a view illustrating the arrangement position of the center steering shaft rotation interlocking mechanism 230 in a case where the leaning vehicle 1 turns left with the maximum turning angle. FIG. 14B is a view illustrating the arrangement position of the center steering shaft rotation interlocking mechanism 230 in a case where the leaning vehicle 1 turns right with the maximum turning angle. FIG. 14C is a schematic diagram illustrating the movable range of the center steering shaft rotation interlocking mechanism 230, including the first mounting member 21d and the second mounting member 22d.

Referring to FIG. 14A, when the leaning vehicle 1 turns left with the maximum turning angle, a right end portion of the first mounting member 21d in the left-right direction of the vehicle body 5 moves further forward in the front-rear direction of the vehicle body 5 compared to when the leaning vehicle 1 is in the non-steering state. A left end portion of the first mounting member 21d in the left-right direction of the vehicle body 5 moves further rearward in the front-rear direction of the vehicle body 5 compared to when the leaning vehicle 1 is in the non-steering state. As a result, the right end portion of the first mounting member 21d in the left-right direction of the vehicle body 5 is disposed further at the front side in the front-rear direction of the vehicle body 5 than the left end portion. At this time, the second mounting member 22*d* interlocks with the first mounting member 21*d* by means of the connection member 23. Consequently, a right end portion of the second mounting member 22*d* in the left-right direction of the vehicle body 5 moves further forward in the front-rear direction of the vehicle body 5 compared to when the leaning vehicle 1 is in the non-steering state. A left end portion of the second mounting member 22*d* in the left-right direction of the vehicle body 5 moves further rearward in the front-rear direction of the vehicle body 5 compared to when the leaning vehicle 1 is in the non-steering state. As a result, the right end portion of the second mounting member 22*d* in the left-right direction of the vehicle body 5 is disposed further at the front side in the front-rear direction of the vehicle body 5 than the left end portion.

Referring to FIG. 14B, when the leaning vehicle 1 turns right with the maximum turning angle, the left end portion of the first mounting member 21*d* in the left-right direction of the vehicle body 5 moves further forward in the front-rear direction of the vehicle body 5 compared to when the leaning vehicle 1 is in the non-steering state. The right end portion of the first mounting member 21*d* in the left-right direction of the vehicle body 5 moves further rearward in the front-rear direction of the vehicle body 5 compared to when the leaning vehicle 1 is in the non-steering state. As a result, the left end portion of the first mounting member 21*d* in the left-right direction of the vehicle body 5 is disposed further at the front side in the front-rear direction of the vehicle body 5 than the right end portion. At this time, the second mounting member 22*d* interlocks with the first mounting member 21*d* by means of the connection member 23. Consequently, the left end portion of the second mounting member 22*d* in the left-right direction of the vehicle body 5 moves further forward in the front-rear direction of the vehicle body 5 compared to when the leaning vehicle 1 is in the non-steering state. The right end portion of the second mounting member 22*d* in the left-right direction of the vehicle body 5 moves further rearward in the front-rear direction of the vehicle body 5 compared to when the leaning vehicle 1 is in the non-steering state. As a result, the left end portion of the second mounting member 22*d* in the left-right direction of the vehicle body 5 is disposed further at the front side in the front-rear direction of the vehicle body 5 than the right end portion.

Based on the arrangement positions of the center steering shaft rotation interlocking mechanism 230 illustrated in FIG. 14A and FIG. 14B, a movable range A230 of the center steering shaft rotation interlocking mechanism 230 is as illustrated in FIG. 14C. That is, the movable range of the first mounting member 21*d* is a region A21*d* which centers on an axis of rotation C21 of the first center steering shaft 21 and which takes the total sum of the maximum turning angle at the time of a left turn and the maximum turning angle at the time of a right turn as a central angle. Similarly, the movable range of the second mounting member 22*d* is a region A22*d* which centers on an axis of rotation C22 of the second center steering shaft 22 and which takes the total sum of the maximum turning angle at the time of a left turn and the maximum turning angle at the time of a right turn as a central angle. Accordingly, the movable range A230 of the center steering shaft rotation interlocking mechanism 230 is a range that includes the region A21*d* and the region A22*d*, and the movable range A23 of the connection member 23.

Figure 14D:
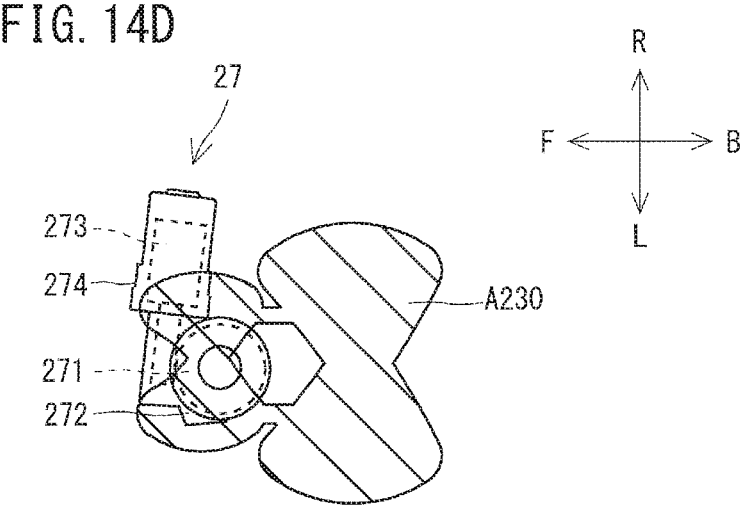
FIG. 14D is a schematic diagram illustrating the arrangement relation between the movable range of the center steering shaft rotation interlocking mechanism shown in FIG. 14C and the actuator.

Referring to FIG. 14D, as viewed from the up direction or the down direction of the vehicle body 5, at least one of at least a part of the shaft mounting portion 271 of the actuator 27, at least a part of the vehicle body mounting portion 272 of the actuator 27, at least a part of the driving portion 273 of the actuator 27, and at least a part of the case portion 274 of the actuator 27 is disposed at a position that overlaps with the movable range A230 of the center steering shaft rotation interlocking mechanism 230.

In the leaning vehicle 1, the steering shaft 20 is composed of two shafts (the first center steering shaft 21 and the second center steering shaft 22). Therefore, the degree of freedom with respect to the arrangement of the actuator 27 increases. In addition, referring to FIG. 14D, as viewed from the up direction or the down direction of the vehicle body 5, the movable range A230 of the center steering shaft rotation interlocking mechanism 230 and the actuator 27 are caused to overlap. Therefore, even when the steering shaft 20 is composed of two shafts to increase the degree of freedom with respect to the actuator 27, an increase in the size of the vicinity of the left steerable front wheel 11L and of the vicinity of the right steerable front wheel 11R is suppressed.

Figure 15:
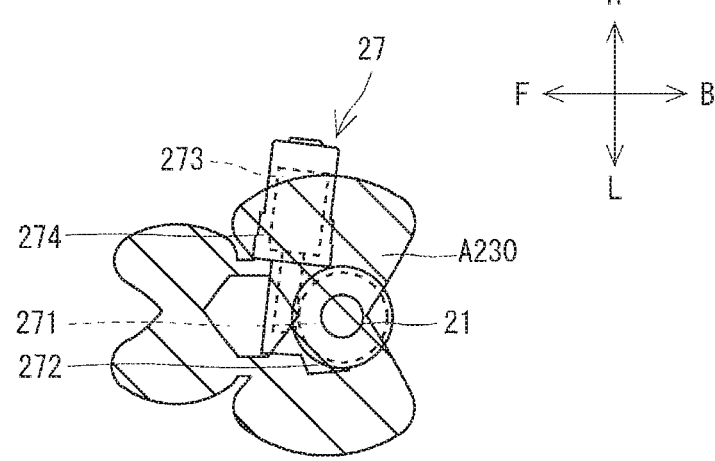
FIG. 15 is a schematic diagram illustrating the arrangement relation between the movable range of the center steering shaft rotation interlocking mechanism shown in FIG. 14C and the actuator, that is different from the arrangement relation illustrated in FIG. 14D.

As long as at least one of at least a part of the shaft mounting portion 271 of the actuator 27, at least a part of the vehicle body mounting portion 272 of the actuator 27, at least a part of the driving portion 273 of the actuator 27, and at least a part of the case portion 274 of the actuator 27 is disposed at a position that overlaps with the movable range A230 of the center steering shaft rotation interlocking mechanism 230 as viewed from the up direction or the down direction of the vehicle body 5, the shaft mounting portion 271 may be non-rotatably mounted on the first center steering shaft 21, or may be non-rotatably mounted on the second center steering shaft 22. This will now be described referring to FIG. 15. In FIG. 15, the shaft mounting portion 271 of the actuator 27 is non-rotatably mounted on the first center steering shaft 21.

Figure 16:
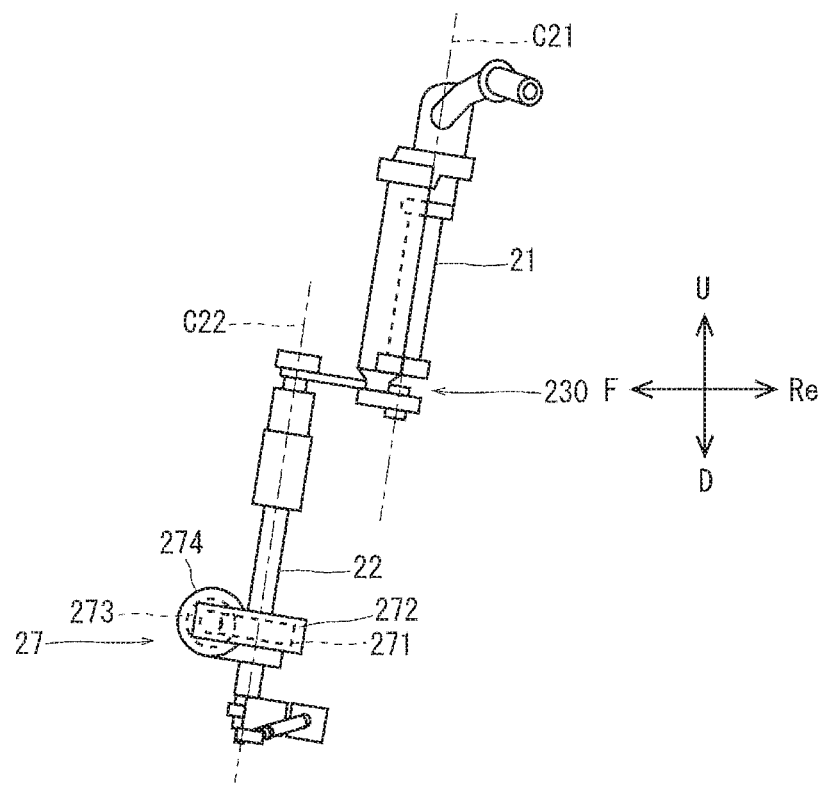
FIG. 16 is a side view of the steering mechanism that is different from FIG. 8.

As long as at least one of at least a part of the shaft mounting portion 271 of the actuator 27, at least a part of the vehicle body mounting portion 272 of the actuator 27, at least a part of the driving portion 273 of the actuator 27, and at least a part of the case portion 274 of the actuator 27 is disposed at a position that overlaps with the movable range A230 of the center steering shaft rotation interlocking mechanism 230 as viewed from the up direction or the down direction of the vehicle body 5, the actuator 27 may be disposed at the upper portion of the second center steering shaft 22 or may be disposed at the lower portion thereof. For example, referring to FIG. 16, if at least one of at least a part of the shaft mounting portion 271 of the actuator 27, at least a part of the vehicle body mounting portion 272 of the actuator 27, at least a part of the driving portion 273 of the actuator 27, and at least a part of the case portion 274 of the actuator 27 is disposed at a position that overlaps with the movable range A230 of the center steering shaft rotation interlocking mechanism 230, the actuator 27 may be disposed at the lower portion of the second center steering shaft 22.

Further, as long as at least one of at least a part of the shaft mounting portion 271 of the actuator 27, at least a part of the vehicle body mounting portion 272 of the actuator 27, at least a part of the driving portion 273 of the actuator 27, and at least a part of the case portion 274 of the actuator 27 is disposed at a position that overlaps with the movable range A230 of the center steering shaft rotation interlocking mechanism 230 as viewed from the up direction or the down direction of the vehicle body 5, the actuator 27 may be disposed at the upper portion of the first center steering shaft 21 or may be disposed at the lower portion thereof. For example, referring to FIG. 17, if at least one of at least a part of the shaft mounting portion 271 of the actuator 27, at least a part of the vehicle body mounting portion 272 of the actuator 27, at least a part of the driving portion 273 of the actuator 27, and at least a part of the case portion 274 of the actuator 27 is disposed at a position that overlaps with the movable range A230 of the center steering shaft rotation interlocking mechanism 230, the actuator 27 may be disposed at the upper portion of the first center steering shaft 21. Referring to FIG. 18, if at least one of at least a part of the shaft mounting portion 271 of the actuator 27, at least a part of the vehicle body mounting portion 272 of the actuator 27, at least a part of the driving portion 273 of the actuator 27, and at least a part of the case portion 274 of the actuator 27 is disposed at a position that overlaps with the movable range A230 of the center steering shaft rotation interlocking mechanism 230, the actuator 27 may be disposed at the lower portion of the first center steering shaft 21.

In short, as long as at least one of at least a part of the shaft mounting portion 271 of the actuator 27, at least a part of the vehicle body mounting portion 272 of the actuator 27, at least a part of the driving portion 273 of the actuator 27, and at least a part of the case portion 274 of the actuator 27 is disposed at a position that overlaps with the movable range A230 of the center steering shaft rotation interlocking mechanism 230, the actuator 27 may be disposed at any position on the first center steering shaft 21 and the second center steering shaft 22.

In the foregoing example, both of the first center steering shaft 21 and the second center steering shaft 22 are supported by the vehicle body 5 in a rotatable manner about the axes C21 and C22 that lean forward or rearward of the vehicle body 5 with respect to the up-down direction of the vehicle body 5. However, the arrangement of the first center steering shaft 21 and the second center steering shaft 22 is not limited thereto.

Figure 19:
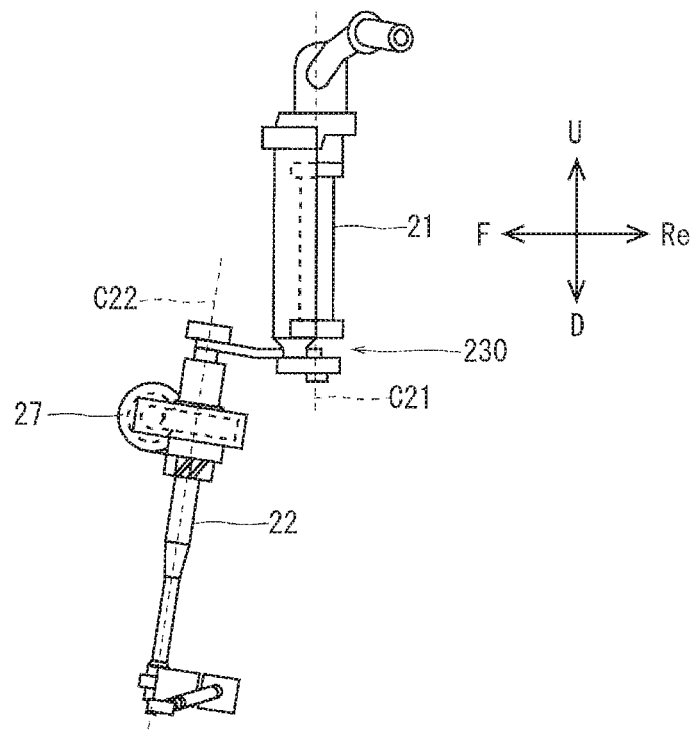
FIG. 19 is a side view of the steering mechanism that is different from FIG. 8 and FIG. 16 to FIG. 18.

Referring to FIG. 19, when viewed from the up direction or the down direction of the vehicle body 5, the first center steering shaft 21 is supported by the vehicle body 5 in a rotatable manner about the axis C21 extending in the up-down direction of the vehicle body 5, and the second center steering shaft 22 is supported by the vehicle body 5 in a rotatable manner about the axis C22 that leans forward or rearward of the vehicle body 5 with respect to the up-down direction of the vehicle body 5. Further, referring to FIG. 20, when viewed from the up direction or the down direction of the vehicle body 5, the second center steering shaft 22 is supported by the vehicle body 5 in a rotatable manner about the axis C22 extending in the up-down direction of the vehicle body 5, and the first center steering shaft 21 is supported by the vehicle body 5 in a rotatable manner about the axis C21 that leans forward or rearward of the vehicle body 5 with respect to the up-down direction of the vehicle body 5.

In short, it is sufficient that at least one of the first center steering shaft and the second center steering shaft is supported by the vehicle body 5 in a rotatable manner about an axis that leans frontward or rearward of the vehicle body 5 with respect to the up-down direction of the vehicle body 5.

Figure 20:
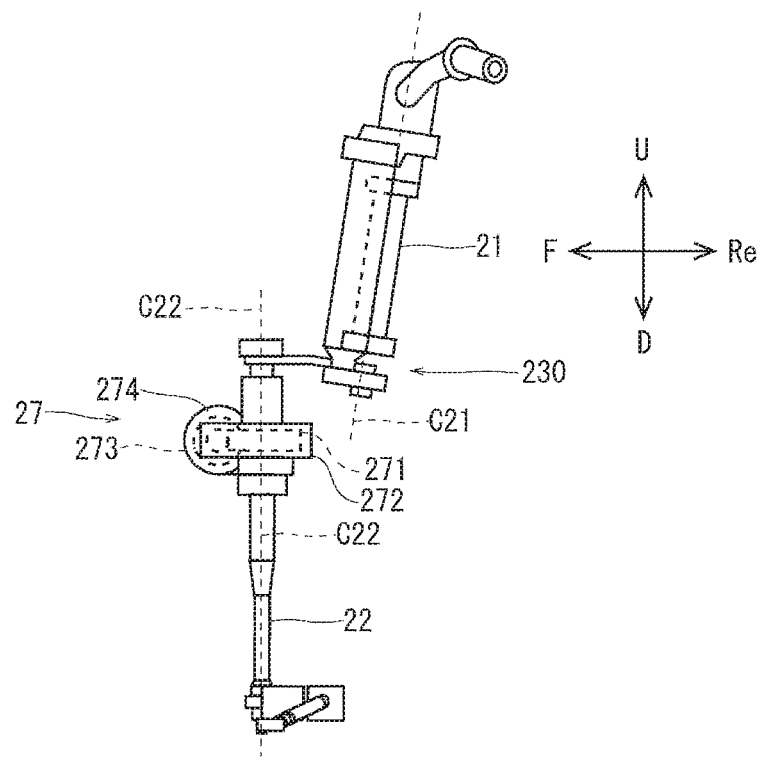
FIG. 20 is a side view of the steering mechanism that is different from FIG. 8 and FIG. 16 to FIG. 19.

Referring to FIG. 20, the shaft mounting portion 271 of the actuator 27 may be non-rotatably mounted on the second center steering shaft 22 that does not lean forward and rearward of the vehicle body 5 with respect to the up-down direction of the vehicle body 5. Further, although not illustrated in the drawings, the shaft mounting portion 271 of the actuator 27 may be non-rotatably mounted on the first center steering shaft 21 that does not lean forward and rearward of the vehicle body 5 with respect to the up-down direction of the vehicle body 5.

Preferably, the shaft mounting portion 271 of the actuator 27 is non-rotatably mounted on the first center steering shaft 21 or the second center steering shaft 22 that is supported by the vehicle body in a rotatable manner about an axis that leans forward or rearward of the vehicle body 5 with respect to the up-down direction of the vehicle body 5.

Figure 17:
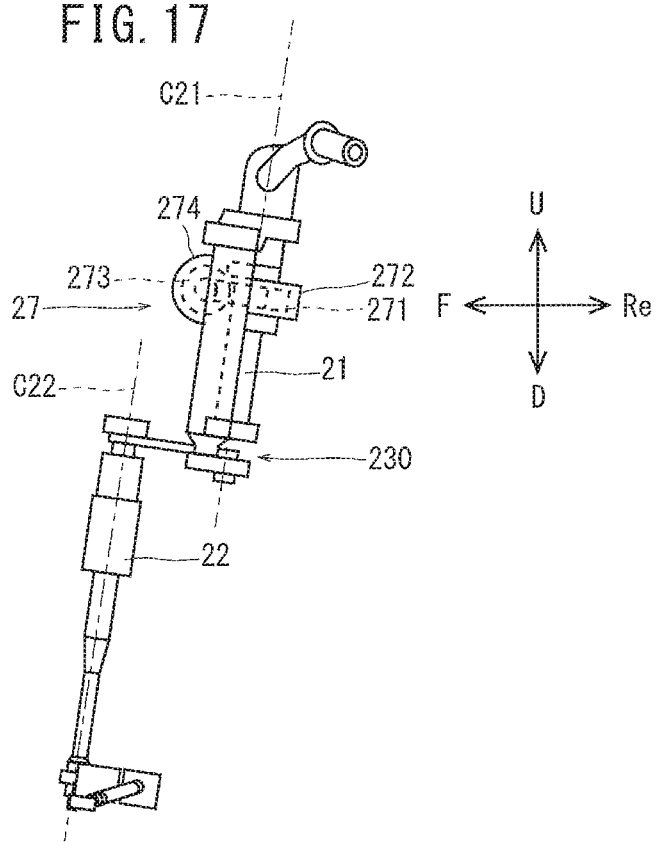
FIG. 17 is a side view of the steering mechanism that is different from FIG. 8 and FIG. 16.
Figure 18:
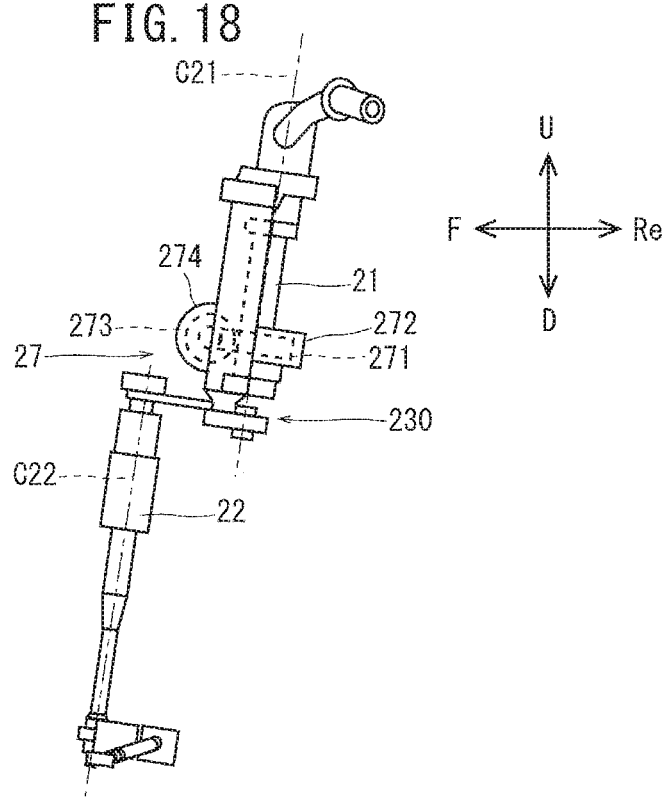
FIG. 18 is a side view of the steering mechanism that is different from FIG. 8, FIG. 16 and FIG. 17.

Referring to FIG. 8, FIG. 17 and FIG. 18, preferably the shaft mounting portion 271 of the actuator 27 is non-rotatably mounted on the first center steering shaft 21 or the upper portion of the second center steering shaft 22. In this case, compared to a case where the shaft mounting portion 271 of the actuator 27 is disposed at the lower portion of the second center steering shaft 22 (FIG. 16), the shaft mounting portion 271 of the actuator 27 is disposed at a position that is close to the center steering shaft rotation interlocking mechanism 230. Therefore, an increase in the size of the vicinity of the left steerable front wheel 11L and of the vicinity of the right steerable front wheel 11R can be further suppressed.

Referring to FIG. 2 and FIG. 8, when the leaning vehicle 1 is upright on a horizontal plane and stopped in a non-steering state, at least one of at least a part of the center steering shaft rotation interlocking mechanism 230, at least a part of the shaft mounting portion 271 of the actuator 27, at least a part of the vehicle body mounting portion 272 of the actuator 27, at least a part of the driving portion 273 of the actuator 27, and at least a part of the case portion 274 of the actuator 27 are disposed at the upper side of the upper end of the left steerable front wheel 11L and the upper side of an upper end 11b of the right steerable front wheel 11R in the up-down direction of the vehicle body 5.

On the upper side of the upper end 11b of the right steerable front wheel 11R and the left steerable front wheel 11L, it is not necessary to take interference between the actuator 27 and the link member 66 into consideration. Therefore, the degree of freedom regarding the arrangement of at least a part of the center steering shaft rotation interlocking mechanism 230 and the actuator 27 is high. Accordingly, if the actuator 27 and the center steering shaft rotation interlocking mechanism 230 are disposed at the upper side of the upper end of the left steerable front wheel 11L and the upper side of the upper end of the right steerable front wheel 11R, interference between the actuator 27 and center steering shaft rotation interlocking mechanism 230 and vehicle components disposed in the vicinity of the left steerable front wheel 11L and the vicinity of the right steerable front wheel 11R is avoided. Thus, an increase in the size of the vicinity of the left steerable front wheel 11L and of the vicinity of the right steerable front wheel 11R can be further suppressed.

Referring to FIG. 8, when the leaning vehicle 1 is upright on a horizontal plane and stopped in a non-steering state, at least one of at least a part of the center steering shaft rotation interlocking mechanism 230, at least a part of the shaft mounting portion 271 of the actuator 27, at least a part of the vehicle body mounting portion 272 of the actuator 27, at least a part of the driving portion 273 of the actuator 27, and at least a part of the case portion 274 of the actuator 27 is disposed at the rear side of the upper end 11t of the left steerable front wheel 11L and the right steerable front wheel 11R in the front-rear direction of the vehicle body 5.

Further, referring to FIG. 13, when the leaning vehicle 1 is upright on a horizontal plane and stopped in a non-steering state, at least one of at least a part of the shaft mounting portion 271 of the actuator 27, at least a part of the vehicle body mounting portion 272 of the actuator 27, at least a part of the driving portion 273 of the actuator 27, and at least a part of the case portion 274 of the actuator 27 is disposed at a position that overlaps with the link member 66 of the leaning mechanism 61 when viewed from the up direction or the down direction of the vehicle body 5.

Furthermore, when the leaning vehicle 1 is upright on a horizontal plane and stopped in a non-steering state, at least a part of the center steering shaft rotation interlocking mechanism 230 is disposed at a position that overlaps with the link member 66 of the leaning mechanism 61 as viewed from the up direction or the down direction of the vehicle body 5.

According to the leaning vehicle 1 of this embodiment, the handle 25 is fixed to the first center steering shaft 21 that is disposed further at the rear side than the second center steering shaft 22. Therefore, the handle 25 can be disposed further at the rear side, and when an occupant rides on the leaning vehicle 1, the center of gravity of the occupant can be positioned further toward the rear.

Referring to FIG. 7 and FIG. 8, if the shaft mounting portion 271 of the actuator 27 is mounted at the upper portion (portion on the upper side of the intermediate position 22*m* between the upper end 22*t* and lower end 22*b*) of the second center steering shaft 22, the length of a portion from the handle 25 to the actuator 27 of the steering shaft 20 can be shortened. In this case, a portion at which the rigidity must be made high in the steering shaft 20 can be shortened. Therefore, the weight of the steering shaft 20 can be reduced.

According to this embodiment, the side stand 67 and the driving portion 273 of the actuator 27 are respectively disposed at the left side and right side of the center of the vehicle body 5 (vehicle center line CL) in the left-right direction of the vehicle body 5. By standing the side stand 67, the vehicle body 5 is maintained in a somewhat leaning posture.

At this time, the actuator 27 is located further at the upper side than when the vehicle body 5 is standing erect. By lowering the side stand 67, maintenance of the actuator 27 can be performed with ease.

Referring to FIG. 8, when the vehicle body 5 is in the upright non-steering state, the actuator 27 is disposed further at the front side than the respective rear ends 11*r* of the left steerable front wheel 11L and the right steerable front wheel 11R. In this case, space can be secured to the rear of the left steerable front wheel 11L and the right steerable front wheel 11R. Further, when the vehicle body 5 is in the upright non-steering state, the actuator 27 is disposed at the rear side of the center 11*c* of the left steerable front wheel 11L and the right steerable front wheel 11R. In this case, space can be secured on the front side of the center 11*c* of the left steerable front wheel 11L and the right steerable front wheel 11R.

An embodiment of the present invention has been described in the foregoing. However, it is needless to say that the present invention can be carried out in various embodiments, and is not limited to the foregoing embodiment.

Terms and expressions used in this specification are used for the purpose of description, and are not used for the purpose of limiting interpretation. Any feature equivalent to the characteristic feature disclosed and described in this specification is not excluded, and it should be recognized that various modifications which fall within the scope of claims of the present invention are included in the present invention. The present invention can be embodied in many different embodiments. This disclosure should be construed to provide principle embodiments of the present invention. These embodiments are described in this specification with the understanding that these embodiments do not intend to limit the present invention to preferable embodiments described and/or illustrated in this specification. The present invention is not limited to the embodiments described in this specification. The present invention also includes any embodiment including an equivalent element, modification, deletion, combination, improvement and/or a change which can be recognized by those who are skilled in the art based on this disclosure. A claim limitation should be broadly construed based on a term used in the claim, and should not be limited to the embodiments described in this specification or in the prosecution of the present application.

REFERENCE SIGNS LIST

1 leaning vehicle
5 vehicle body
11L left steerable front wheel
11R right steerable front wheel
12 rear wheel
21 first center steering shaft
21*d* first mounting member
22 second center steering shaft
22*d* second mounting member
23 connection member
26 tie rod
27 actuator
60 steering mechanism
61 leaning mechanism

What is claimed is:
1. A leaning vehicle comprising:
a vehicle body capable of leaning leftward and rightward;
a rear wheel supported by the vehicle body;
a power unit configured to generate a driving force;
a left steerable front wheel and a right steerable front wheel that are steerable, and that are disposed at a front side of the rear wheel in a front-rear direction of the vehicle body and are disposed side by side in a left-right direction of the vehicle body;
a steering mechanism that includes a handle, and that is capable of steering the left steerable front wheel and the right steerable front wheel by means of an operation of the handle;
an actuator that applies a steering force to the left steerable front wheel and the right steerable front wheel; and
a leaning mechanism that includes a link member which is supported by the vehicle body in a rotatable manner about an axis extending in the front-rear direction of the vehicle body and which supports the left steerable front wheel and the right steerable front wheel, and that causes the vehicle body, the left steerable front wheel and the right steerable front wheel to lean leftward of the leaning vehicle when the leaning vehicle turns left, and that causes the vehicle body, the left steerable front wheel and the right steerable front wheel to lean rightward of the leaning vehicle when the leaning vehicle turns right;
the steering mechanism comprising:
a first center steering shaft that includes the handle, and that is supported by the vehicle body in a rotatable manner with respect to the vehicle body and is provided at a center of the leaning vehicle in the left-right direction of the leaning vehicle, a second center steering shaft that is supported by the vehicle body in a rotatable manner with respect to the vehicle body, and is provided at a front side of the first center steering shaft in the front-rear direction of the vehicle body and is provided at the center of the leaning vehicle in the left-right direction of the leaning vehicle, a center steering shaft rotation interlocking mechanism that includes a first mounting member which is non-rotatably mounted at a lower portion of the first center steering shaft, a second mounting member which is non-rotatably mounted at an upper portion of the second center steering shaft, and a connection member which connects the first mounting member and the second mounting member, and that interlocks rotation of the first center steering shaft with rotation of the second center steering shaft, and a left-right rotation interlocking mechanism that includes an arm member which is provided at a lower portion of the second center steering shaft and which rotates together with the second center steering shaft, and a tie rod which is mounted on the arm member and which is displaceable leftward and rightward of the vehicle body, and that steers the left steerable front wheel and the right steerable front wheel by means of rotation of the second center steering shaft;

wherein at least one of the first center steering shaft or the second center steering shaft is supported by the vehicle body in a rotatable manner about an axis that leans forward or rearward of the vehicle body with respect to an up-down direction of the vehicle body; and the actuator comprising:

a shaft mounting portion that is non-rotatably mounted on the first center steering shaft or the second center steering shaft, a vehicle body mounting portion that is non-rotatably mounted on the vehicle body, a driving portion that is provided between the shaft mounting portion and the vehicle body mounting portion, and that applies a force to the shaft mounting portion with respect to the vehicle body, and a case portion that covers at least one of at least a part of the shaft mounting portion, at least a part of the vehicle body mounting portion, or at least a part of the driving portion;

wherein:

as viewed from an up direction of the vehicle body, when the leaning vehicle is upright on a horizontal plane and stopped in a non-steering state, the shaft mounting portion, the vehicle body mounting portion, the driving portion and the case portion are provided between a left end and a right end of the link member of the leaning mechanism in the left-right direction of the vehicle body;

the first center steering shaft and the second center steering shaft are disposed further forward than a front end of the power unit when viewed in the left-right direction of the leaning vehicle and are positioned in the center of the leaning vehicle in the left-right direction of the leaning vehicle between the left steerable front wheel and the right steerable front wheel;

the second center steering shaft overlaps the left steerable front wheel and the right steerable front wheel when viewed in the left-right direction of the leaning vehicle; and as viewed from the up direction or a down direction of the vehicle body, at least one of the at least the part of the shaft mounting portion, the at least the part of the vehicle body mounting portion, the at least the part of the driving portion, or at least a part of the case portion is provided at a position that overlaps with a movable range of the center steering shaft rotation interlocking mechanism.

2. The leaning vehicle according to claim 1, wherein the shaft mounting portion of the actuator is non-rotatably mounted on the first center steering shaft or the second center steering shaft that is supported by the vehicle body in a rotatable manner about an axis that leans forward or rearward of the vehicle body with respect to the up-down direction of the vehicle body.

3. The leaning vehicle according to claim 1, wherein the shaft mounting portion of the actuator is non-rotatably mounted at an upper portion of the first center steering shaft or the second center steering shaft.

4. The leaning vehicle according to claim 1, wherein when the leaning vehicle is upright on a horizontal plane and stopped in a non-steering state, at least one of at least a part of the center steering shaft rotation interlocking mechanism, the at least the part of the shaft mounting portion of the actuator, the at least the part of the vehicle body mounting portion of the actuator, the at least the part of the driving portion of the actuator, or the at least the part of the case portion of the actuator is disposed at an upper side of an upper end of the left steerable front wheel and an upper end of the right steerable front wheel in the up-down direction of the vehicle body.

5. The leaning vehicle according to claim 1, wherein when the leaning vehicle is upright on a horizontal plane and stopped in a non-steering state, at least one of at least a part of the center steering shaft rotation interlocking mechanism, the at least the part of the shaft mounting portion of the actuator, the at least the part of the vehicle body mounting portion of the actuator, the at least the part of the driving portion of the actuator, or the at least the part of the case portion of the actuator is disposed at a rear side of an upper end of the left steerable front wheel and an upper end of the right steerable front wheel in the front-rear direction of the vehicle body.

6. The leaning vehicle according to claim 1, wherein when the leaning vehicle is upright on a horizontal plane and stopped in a non-steering state, at least one of the at least the part of the shaft mounting portion of the actuator, the at least the part of the vehicle body mounting portion of the actuator, the at least the part of the driving portion of the actuator, or the at least the part of the case portion of the actuator is disposed at a position that overlaps with the link member of the leaning mechanism as viewed from the up direction or the down direction of the vehicle body.

7. The leaning vehicle according to claim 1, wherein when the leaning vehicle is upright on a horizontal plane and stopped in a non-steering state, at least a part of the center steering shaft rotation interlocking mechanism is disposed at a position that overlaps with the link member of the leaning mechanism as viewed from the up direction or the down direction of the vehicle body.

8. The leaning vehicle according to claim 1, wherein the second center steering shaft is disposed further forward than a rear end of each of the left steerable front wheel and the right steerable front wheel when viewed in the left-right direction of the leaning vehicle.

9. The leaning vehicle according to claim 1, wherein a front end of the actuator is positioned further forward than a rear end of each of the left steerable front wheel and the right steerable front wheel when viewed in the left-right direction of the leaning vehicle.

10. The leaning vehicle according to claim 1, wherein a lower end of the actuator is positioned further upward than an upper end of each of the left steerable front wheel and the right steerable front wheel when viewed in the left-right direction of the leaning vehicle.

11. A leaning vehicle comprising:
a vehicle body capable of leaning in a left-right direction of the leaning vehicle;
a power unit configured to generate a driving force for traveling the leaning vehicle;
a left steerable front wheel and a right steerable front wheel disposed side by side in a left-right direction of the vehicle body and capable of leaning together with the vehicle body;
a steering mechanism that includes a handle, and that is capable of steering the left steerable front wheel and the right steerable front wheel by means of an operation of the handle; and
an actuator that applies a steering force to the left steerable front wheel and the right steerable front wheel;
the steering mechanism comprising:
a first center steering shaft supported by the vehicle body in a rotatable manner with respect to the vehicle body and provided at a center of the leaning vehicle in the left-right direction of the leaning vehicle,
a second center steering shaft supported by the vehicle body in a rotatable manner with respect to the vehicle body, and disposed further forward than the first center steering shaft and provided at the center of the leaning vehicle in the left-right direction of the leaning vehicle,
a center steering shaft rotation interlocking mechanism interlocking rotation of the first center steering shaft with rotation of the second center steering shaft, and
wherein at least one of the first center steering shaft or the second center steering shaft is supported by the vehicle body in a rotatable manner about an axis that leans forward or rearward of the vehicle body with respect to an up-down direction of the vehicle body; and
wherein the first center steering shaft and the second center steering shaft are disposed further forward than a front end of the power unit when viewed in the left-right direction of the leaning vehicle and are positioned in the center of the leaning vehicle in the left-right direction of the leaning vehicle between the left steerable front wheel and the right steerable front wheel, the second center steering shaft overlaps the left steerable front wheel and the right steerable front wheel when viewed in the left-right direction of the leaning vehicle, and at least a part of the actuator overlaps a movable range of the center steering shaft rotation interlocking mechanism when viewed in the up-down direction of the leaning vehicle.

* * * * *